US011961458B2

(12) United States Patent
Kim et al.

(10) Patent No.: US 11,961,458 B2
(45) Date of Patent: Apr. 16, 2024

(54) DISPLAY APPARATUS AND CONTROL METHOD THEREFOR

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Hoseop Lee, Suwon-si (KR); Donggun Oh, Suwon-si (KR); Jongsu Oh, Suwon-si (KR)

(73) Assignees: SAMSUNG ELECTRONICS CO., LTD., Suwon-si (KR); RESEARCH & BUSINESS FOUNDATION UNIVERSITY, Suwon-si (KR)

( * ) Notice: Subject to any disclaimer, the term of this patent is extended or adjusted under 35 U.S.C. 154(b) by 0 days.

(21) Appl. No.: 18/098,528

(22) Filed: Jan. 18, 2023

(65) Prior Publication Data

US 2023/0154394 A1 May 18, 2023

Related U.S. Application Data

(63) Continuation of application No. PCT/KR2021/008292, filed on Jun. 30, 2021.

(30) Foreign Application Priority Data

Aug. 11, 2020 (KR) ........................ 10-2020-0100585

(51) Int. Cl.
*G09G 3/32* (2016.01)

(52) U.S. Cl.
CPC ....... *G09G 3/32* (2013.01); *G09G 2300/0452* (2013.01); *G09G 2310/0297* (2013.01);
(Continued)

(58) Field of Classification Search
CPC .................. G09G 3/32; G09G 3/2014; G09G 2300/0819; G09G 3/2011;
(Continued)

(56) References Cited

U.S. PATENT DOCUMENTS 7,167,169 B2 1/2007 Libsch et al.
7,656,371 B2 2/2010 Shimizu et al.
(Continued)

FOREIGN PATENT DOCUMENTS

CN 109903721 A 6/2019
CN 111477164 B 4/2022
(Continued)

OTHER PUBLICATIONS

International Written Opinion dated Sep. 29, 2021 issued by the International Searching Authority in counterpart International Application No. PCT/KR2021/008292 (PCT/ISA/237).
(Continued)

*Primary Examiner* — Koosha Sharifi-Tafreshi
(74) *Attorney, Agent, or Firm* — Sughrue Mion, PLLC

(57) ABSTRACT

A display device includes: a display panel including a pixel array, in which pixels that include a plurality of inorganic light-emitting devices of different colors are arranged in a matrix form, and a pixel circuit that is provided for each of the plurality of inorganic light-emitting devices, and the pixel circuit controls, on the basis of an applied image data voltage, the driving time and the magnitude of driving current provided to the inorganic light-emitting devices; a sensor which senses, on the basis of a voltage applied to the pixel circuit, a current flowing through a driving transistor included in the pixel circuit and which outputs sensing data corresponding to the sensed current; and a corrector which corrects, on the basis of the sensed data, the image data voltage applied to the pixel circuit.

15 Claims, 18 Drawing Sheets

(52) U.S. Cl.
CPC ............... *G09G 2320/0242* (2013.01); *G09G 2320/0257* (2013.01)

(58) Field of Classification Search
CPC ... G09G 2320/0233; G09G 2300/0452; G09G 2320/0242; G09G 2320/0295
See application file for complete search history.

(56) References Cited

U.S. PATENT DOCUMENTS

| | | | | |
|---|---|---|---|---|
| 7,808,497 | B2 | 10/2010 | Lo et al. | |
| 8,194,063 | B2 | 6/2012 | Levey et al. | |
| 8,432,106 | B2 | 4/2013 | Horvath et al. | |
| 10,467,960 | B2 | 11/2019 | Do et al. | |
| 10,706,766 | B2 | 7/2020 | Kim et al. | |
| 10,825,380 | B2 | 11/2020 | Kim et al. | |
| 2007/0120496 | A1 | 5/2007 | Shimizu et al. | |
| 2010/0225634 | A1 | 9/2010 | Levey et al. | |
| 2017/0061871 | A1 | 3/2017 | Xiang et al. | |
| 2017/0263183 | A1 | 9/2017 | Lin et al. | |
| 2018/0053460 | A1* | 2/2018 | Watsuda | G09G 3/32 |
| 2018/0240403 | A1 | 8/2018 | Wang et al. | |
| 2019/0035331 | A1 | 1/2019 | Do et al. | |
| 2019/0228708 | A1* | 7/2019 | Yang | G09G 3/3233 |
| 2019/0371231 | A1 | 12/2019 | Kim et al. | |
| 2019/0371232 | A1* | 12/2019 | Kim | G09G 3/2011 |
| 2020/0105195 | A1* | 4/2020 | Song | G09G 3/3241 |
| 2020/0106976 | A1 | 4/2020 | Lee et al. | |
| 2020/0111403 | A1 | 4/2020 | Kim et al. | |

FOREIGN PATENT DOCUMENTS

| | | | |
|---|---|---|---|
| KR | 10-2003-0044566 | A | 6/2003 |
| KR | 10-2006-0056348 | A | 5/2006 |
| KR | 10-2011-0123279 | A | 11/2011 |
| KR | 10-2019-0012445 | A | 2/2019 |
| KR | 10-2019-0136882 | A | 12/2019 |
| KR | 10-2020-0036999 | A | 4/2020 |

OTHER PUBLICATIONS

International Search Report dated Sep. 29, 2021 issued by the International Searching Authority in counterpart International Application No. PCT/KR2021/008292 (PCT/ISA/210).

* cited by examiner

DISPLAY APPARATUS AND CONTROL METHOD THEREFOR

CROSS-REFERENCE TO RELATED APPLICATION(S)

This application is a bypass continuation of PCT International Application No. PCT/KR2021/008292 filed on Jun. 30, 2021, which claims priority to Korean Patent Application No. 10-2020-0100585, filed on Aug. 11, 2020. The above applications are hereby incorporated by reference, in their entireties, into the present application.

BACKGROUND

1. Field

The disclosure relates to a display apparatus and, more particularly to, a display apparatus including a pixel array including self-emitting elements and a control method therefor.

2. Description of Related Art

In a display apparatus where an inorganic light-emitting element such as a red light-emitting diode (LED), a green LED, and a blue LED (hereinafter, LED refers to an inorganic light-emitting element) is driven as a sub pixel, a gray scale of a sub pixel is represented by a pulse amplitude modulation (PAM) driving method.

In this example, depending on the magnitude of a driving current, the wavelength as well as a gray scale of emitted light may change, resulting in decrease in color reproducibility of an image. FIG. 1 is a graph illustrating a change in wavelength according to the size of a driving current flowing through a blue LED, a green LED, and a red LED.

Each sub pixel is driven through a pixel circuit including a driving transistor. A threshold voltage Vth or mobility μ of the driving transistor may be different for each driving transistor. This results in a decrease in the luminance uniformity of the display apparatus and thus may be problematic.

SUMMARY

One or more embodiments provide a display apparatus for providing improved color reproducibility with respect to an input image signal and a driving method thereof.

One or more embodiments provide a display apparatus including pixel circuits capable of driving an inorganic light-emitting element constituting sub pixels more efficiently and stably, and a driving method thereof.

One or more embodiments provide a display apparatus including a driving circuit suitable for high density integration by optimizing a design of various driving circuits driving an inorganic light-emitting element, and a driving method thereof.

In accordance with an aspect of the disclosure, a display apparatus includes: a display panel including a pixel array, in which pixels that include a plurality of inorganic light-emitting elements of different colors are arranged in a matrix form, and a pixel circuit that is provided for each of the plurality of inorganic light-emitting elements, and the pixel circuit is configured to control, based on an applied image data voltage, a duration and a magnitude of a driving current provided to the inorganic light-emitting elements; a sensor configured to sense, based on a voltage applied to the pixel circuit, a current flowing through a driving transistor included in the pixel circuit, and the sensor is configured to output sensing data corresponding to the sensed current; and a corrector configured to correct, based on the sensing data, the image data voltage applied to the pixel circuit.

The image data voltage may include constant current generator data voltage and pulse width modulation (PWM) data voltage, wherein the pixel circuit may include: a constant current generator circuit including a first driving transistor configured to control the magnitude of the driving current based on the constant current generator data voltage; and a PWM circuit including a second driving transistor configured to control the duration of the driving current based on the PWM data voltage.

The voltage may include a first voltage applied to the constant current generator circuit and a second voltage applied to the PWM circuit, and, wherein the sensor may be further configured to: sense a first current flowing through the first driving transistor based on the first voltage and output first sensing data corresponding to the first current, and sense a second current flowing through the second driving transistor based on the second voltage and output second sensing data corresponding to the second current.

The pixel circuit may include: a first transistor having a source terminal connected to a drain terminal of the first driving transistor and a drain terminal connected to the sensor; and a second transistor having a source terminal connected to a drain terminal of the second driving transistor and a drain terminal connected to the sensor, wherein the first current may be provided to the sensor through the first transistor while the first voltage is applied to the constant current generator circuit, and wherein the second current may be provided to the sensor through the second transistor while the second voltage is applied to the PWM circuit.

The corrector may be further configured to correct the constant current generator data voltage based on the first sensing data and correct the PWM data voltage based on the second sensing data.

The sensor may be further configured to sense the current flowing through the driving transistor based on the voltage applied in a blanking interval of one image frame and output sensing data corresponding to the sensed current.

The voltage may be applied to pixel circuits corresponding to one pixel line of the pixel array per frame.

The voltage may be applied to pixel circuits corresponding to a plurality of pixel lines of the pixel array per image frame.

The pixel circuit may be configured to provide, based on the constant current generator data voltage being applied to a gate terminal of the first driving transistor and the PWM data voltage being applied to a gate terminal of the second driving transistor, and based on a sweep voltage that linearly changes being applied, a driving voltage of a magnitude corresponding to the constant current generator data voltage to the inorganic light-emitting element until a voltage of the gate terminal of the second driving transistor changes according to the sweep voltage and the second driving transistor is turned on.

The constant current generator circuit may include: a first capacitor connected between a source terminal of the first driving transistor and a gate terminal; and a third transistor for applying the constant current generator data voltage to the gate terminal of the first driving transistor while being turned on, wherein the PWM circuit may include: a second capacitor including one end to which a linearly changing sweep voltage is applied and the other end connected to a gate terminal of the second driving transistor; and a fourth transistor configured to apply the PWM data voltage to a gate terminal of the second driving transistor while being turned on, wherein the drain terminal of the second driving transistor may be connected to the gate terminal of the first driving transistor.

The pixel circuit may include: a fifth transistor disposed between a drain terminal of the first driving transistor and an anode terminal of the inorganic light-emitting element, wherein the fifth transistor may be turned on while the sweep voltage is applied.

The constant current generator circuit and the PWM circuit are driven by different driving voltages.

The inorganic light-emitting element may be a light-emitting diode having a magnitude of 100 micrometers or less.

The plurality of light-emitting elements of different colors may be red, green, or blue inorganic light-emitting elements, or red, green, blue, and white inorganic light-emitting elements.

In accordance with an aspect of the disclosure, a method of controlling a display apparatus including a display panel, wherein the display panel includes: a pixel array, in which pixels composed of a plurality of inorganic light-emitting elements of different colors are arranged in a matrix form, and a pixel circuit that is provided for each of the plurality of inorganic light-emitting elements, and the pixel circuit controlling, based on an applied image data voltage, a duration and a magnitude of a driving current provided to the inorganic light-emitting elements, wherein the method includes: sensing, based on a voltage applied to the pixel circuit, a current flowing through a driving transistor included in the pixel circuit; and correcting, based on sensing data corresponding to the sensed current, the image data voltage applied to the pixel circuit.

According to embodiments, changing the wavelength of light emitted from the inorganic light-emitting element according to gray scale may be prevented.

Also, stains that may appear in an image due to the threshold voltage and mobility difference between driving transistors may be easily compensated. In addition, the color correction may be facilitated.

In the case of forming a modular display panel by combining the display modules, or forming one display panel having one large TFT backplane using the display module, the stain compensation and color correction may be more easily performed.

A more optimized driving circuit may be designed, and an inorganic light-emitting element may be driven stably and efficiently.

DETAILED DESCRIPTION

Below, detailed descriptions of related art techniques may be omitted to avoid obscuring the description. In addition, the description of the same configurations may be omitted.

The suffix "part" for a component used herein is added or used in consideration of the convenience of the specification, and it is not intended to have a meaning or role that is distinct from each other.

The terminology used herein is to describe an embodiment, and is not limiting. A singular expression includes plural expressions unless the context clearly indicates otherwise.

As used herein, the term "has," "may have," "includes" or "may include" indicates existence of a corresponding feature (e.g., a numerical value, a function, an operation, or a constituent element such as a component), but does not exclude existence of an additional feature.

As used herein, the terms such as "1st" or "first," "2nd" or "second," etc., may modify corresponding components regardless of importance or order and are used to distinguish one component from another without limiting the components. For example, a first component may be referred to as a second component, and similarly, a second component may also be referred to as a first component.

If it is described that an element (e.g., first element) is "operatively or communicatively coupled with/to" or is "connected to" another element (e.g., second element), it may be understood that the element may be connected to the other element directly or through still another element (e.g., third element).

When it is mentioned that one element (e.g., first element) is "directly coupled" with or "directly connected to" another element (e.g., second element), it may be understood that there is no element (e.g., third element) present between the element and the other element.

The terms used herein may be interpreted in a meaning commonly known to those of ordinary skill in the art unless otherwise defined.

Certain embodiments will be described in detail with reference to the accompanying drawings.

Figure 1:
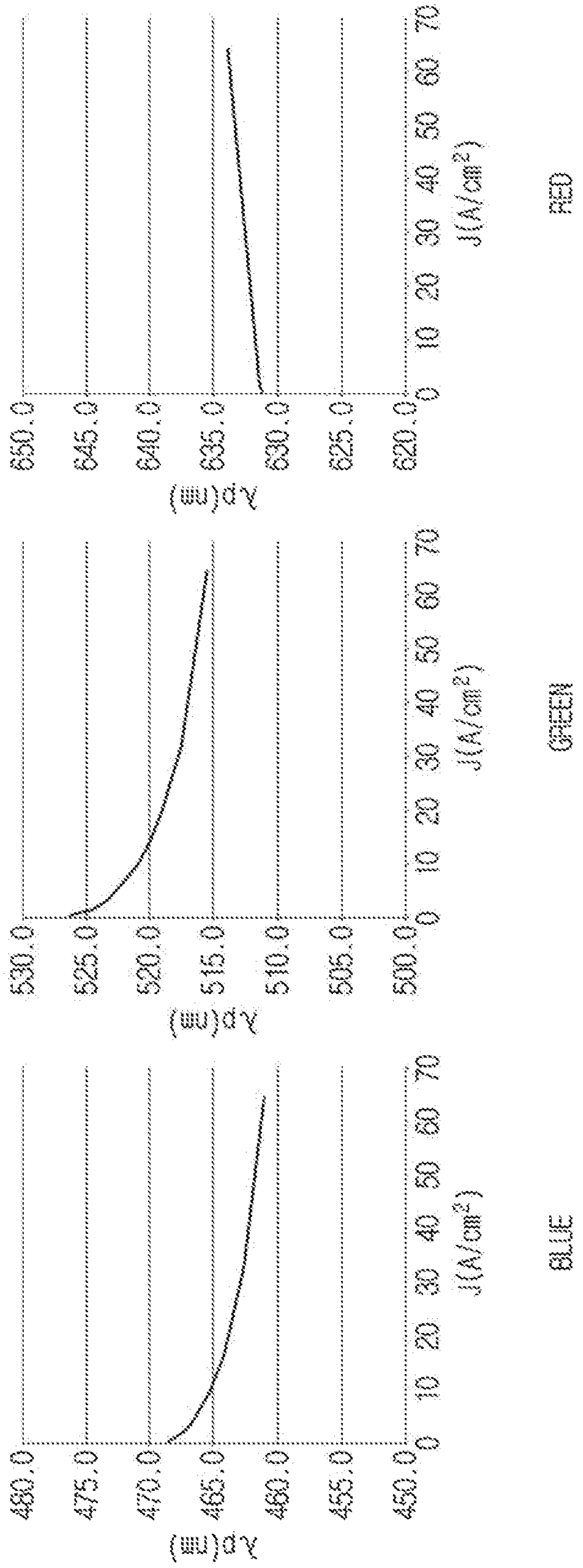
FIG. 1 is a graph illustrating a change in wavelength according to the size of a driving current flowing through a blue LED, a green LED, and a red LED.

FIG. 1 is a graph illustrating a change in wavelength according to the size of a driving current flowing through a blue LED, a green LED, and a red LED.

Figure 2:
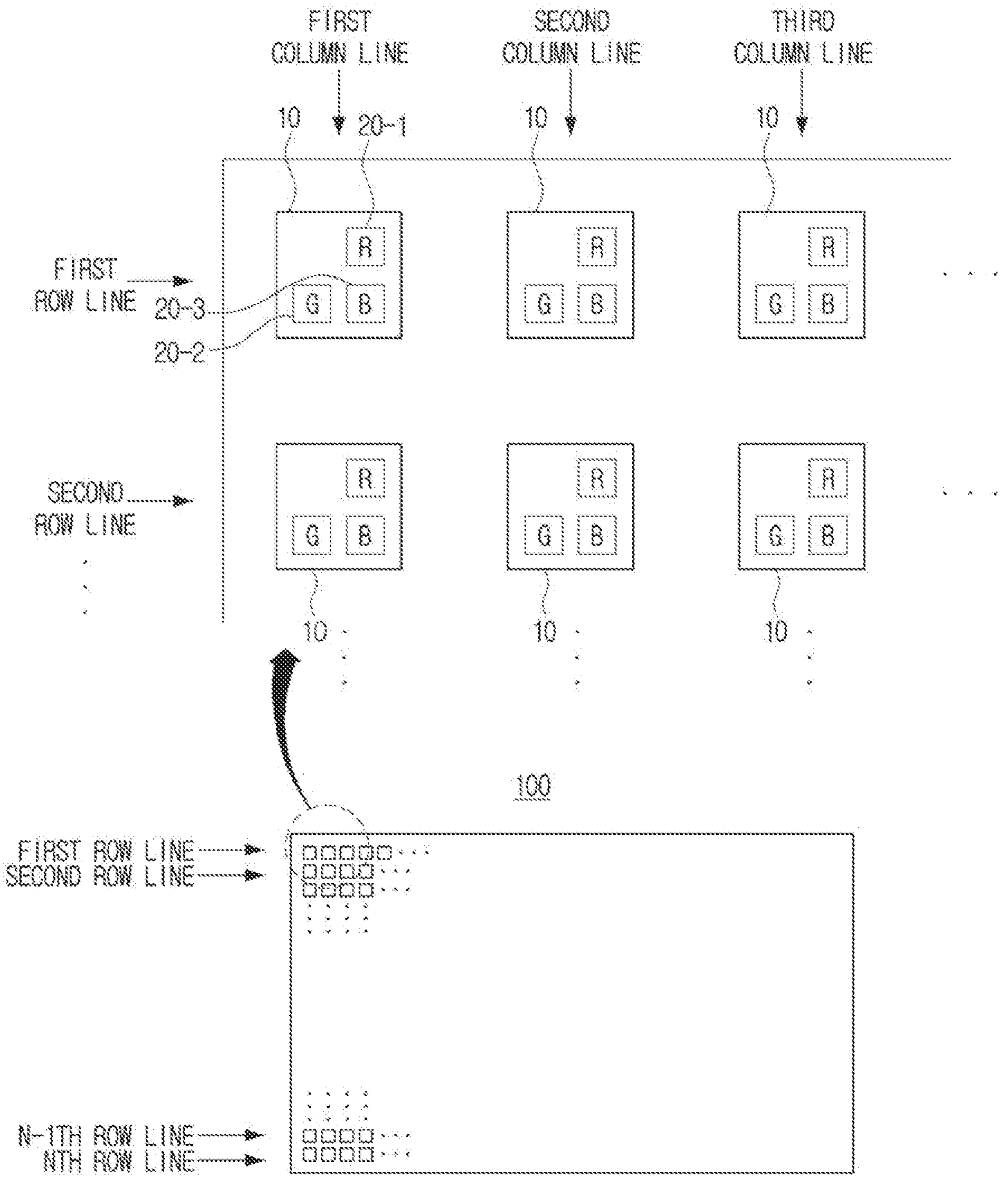
FIG. 2 illustrates a pixel structure of a display apparatus, according to an embodiment.

FIG. 2 illustrates a pixel structure of a display panel according to an embodiment.

Referring to FIG. 2, a display panel 100 includes a plurality of pixels 10 disposed or arranged in a matrix form, that is, pixel array.

The pixel array includes a plurality of row lines or a plurality of column lines. The row line may also be called a horizontal line, a scan line, or a gate line, and the column line may also be called a vertical line or a data line.

A term row line, column line, horizontal line, vertical line may be used as a word to refer to a line on a pixel array, and the term such as a scan line, gate line, and data line may be used as a word to refer to the actual line on the display panel 100 to which data or signals are transferred.

Each pixel 10 of the pixel array includes a plurality of inorganic light-emitting elements 20-1, 20-2, 20-3 of different colors constituting subpixels of a corresponding pixel. For example, as shown in FIG. 2, each pixel 10 may include three types of inorganic light-emitting devices such as a red R inorganic light-emitting device 20-1, a green G inorganic light-emitting device 20-2, and a blue B inorganic light-emitting device 20-3.

Here, the inorganic light-emitting element refers to a light-emitting element manufactured by using an inorganic material, which is different from an organic light-emitting diode (OLED) manufactured by using an organic material.

In particular, according to an embodiment of the disclosure, the inorganic light-emitting device may be a micro LED (mu-LED) having a size of 100 micrometers (μm) or less. In this case, the display panel 100 becomes a micro LED display panel in which each sub pixel is implemented as a micro LED.

The micro LED display panel is one of flat panel display panels and consists of a plurality of inorganic light-emitting diodes each of which is 100 micrometers or less. The micro LED display panel provides better contrast, response time and energy efficiency compared to liquid crystal display (LCD) panels requiring backlight. All of the organic light-emitting diode (OLED) and the micro LED have good energy efficiency, but the micro LED provides better performance in terms of brightness, luminous efficiency, and life expectancy.

In various embodiments, inorganic light-emitting element does not be necessarily limited to the micro LED.

The display panel 100 includes a pixel circuit for controlling magnitude and duration of a driving current provided to the inorganic light-emitting element on the basis of an applied image data voltage.

A pixel circuit is provided for each inorganic light-emitting element included in the display panel 100, and may include a constant current generator circuit for controlling the magnitude of a driving current to drive an inorganic light-emitting element in a pulse amplitude modulation (PAM) pulse and a PWM circuit for controlling a driving time of the driving current to drive the inorganic light-emitting element with a pulse width modulation (PWM).

In particular, when the inorganic light-emitting element is driven by the PWM driving method, even if the magnitude of the driving current is the same, various gray scale may be expressed by varying the duration of the driving current. Therefore, according to various embodiments of the disclosure, it is possible to solve a problem that a wavelength of light emitted by an LED (particularly, a micro LED) changes according to a gray scale, which is a problem that may occur when an LED is driven only by a PAM method.

Referring to FIG. 2, the inorganic light-emitting elements 20-1 to 20-3 are arranged in an L-shape in which left and right of the sub pixel circuits are changed in one-pixel 10. However, the arrangement form of the illustrated inorganic light-emitting elements 20-1 to 20-3 is merely an example, and may be arranged in various forms according to an embodiment in a pixel.

Also, in the above-described example, the pixel is composed of an inorganic light-emitting element of the type R, G, and B, but the embodiment is not limited thereto. For example, the pixel may be composed of four kinds of inorganic light-emitting elements such as R, G, B, and white (W). In this example, since the W inorganic light-emitting element is used for the luminance representation of the pixel, power consumption may be reduced compared to a pixel composed of an inorganic light-emitting element of the type R, G, and B. Hereinafter, for convenience of description, a case in which the pixel 10 includes three types of sub-pixels, such as R, G, and B, will be described as an example.

Figure 3:
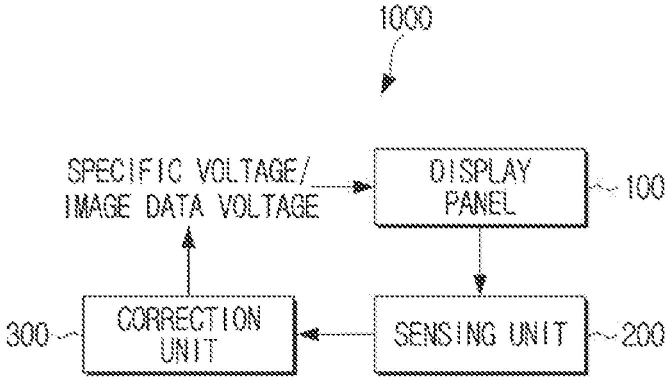
FIG. 3 is a block diagram illustrating a display apparatus, according to an embodiment.

FIG. 3 is a block diagram illustrating a display apparatus according to an embodiment. Referring to FIG. 3, a display apparatus 1000 includes the display panel 100, a sensing unit 200 (e.g., sensor), and a correction unit 300 (e.g., corrector).

The display panel 100 may include a pixel array as described above in FIG. 2, and display an image corresponding to an applied image data voltage.

To be specific, each pixel circuit included in the display panel 100 may provide a driving current in which magnitude and driving time (or pulse width) are controlled based on an applied image data voltage, to a corresponding inorganic light-emitting element. Accordingly, the inorganic light-emitting device emits light with different luminance according to magnitude and driving time of the provided driving current, and the display panel 100 displays an image corresponding to the applied image data voltage.

The pixel circuits for providing the driving current to the inorganic light-emitting element include a driving transistor. The driving transistor is a key configuration for determining the operation of the pixel circuits, and in theory, an electrical characteristic such as the threshold voltage Vth of the driving transistor or the mobility μ should be equal to each other between the pixel circuits of the display panel 100. However, the threshold voltage Vth and mobility μ of the actual driving transistor may be different for pixel circuits due to various factors such as a process non-conformity or a time change, and this non-conformity may cause deterioration of image and thus needs to be compensated.

In various embodiments, non-conformity of driving transistors is compensated through an external compensation scheme. In the external compensation scheme, a current flowing through a driving transistor is sensed, and an image data voltage is corrected on the basis of a sensing result, thereby compensating a threshold voltage (Vth) and a mobility μ non-conformity of a driving transistor among pixel circuits.

The sensing unit 200 is configured to sense current flowing over the driving transistor included in the pixel circuit and output sensing data corresponding to the sensed current.

The sensing unit 200 may, when the current based on specific voltage flows over the driving transistor, may convert the current flowing over the driving transistor to the sensing data and may output the converted sensing data to the correction unit 300. Here, the specific voltage refers to a voltage applied to the pixel circuits separately from the image data voltage in order to sense the current flowing through the driving transistor included in the pixel circuits.

The correction unit 300 is configured to correct image data voltage applied to the pixel circuit based on the sensing data.

More specifically, the correction unit 300 may obtain a compensation value for correcting image data on the basis of a lookup table including a sensing data value for each voltage and sensing data outputted from the sensing unit 200.

In addition, the lookup table including sensing data by voltages may be pre-stored in various memories inside or outside the correction unit 300, and the correction unit 300 may load the lookup table from the memory, if necessary.

The correction unit 300 may correct image data voltage applied to the pixel circuits by correcting the image data based on the obtained compensation value.

Accordingly, the threshold voltage Vth and mobility μ non-conformity of the driving transistor between the pixel circuits may be compensated.

As described above in FIG. 2, in various embodiments of the disclosure, the pixel circuit includes a constant current generator circuit and a PWM circuit, and each of the constant current generator circuit and the PWM circuit includes a driving transistor. Therefore, according to various embodiments of the disclosure, the deviation between the threshold voltage (Vth) and mobility (μ) between the driving transistors included in the constant current generator circuits and the deviation of the threshold voltage (Vth) and mobility (μ) between the driving transistors included in the PWM circuits should all be compensated. This will be described in more detail with reference to FIG. 4.

Figure 4:
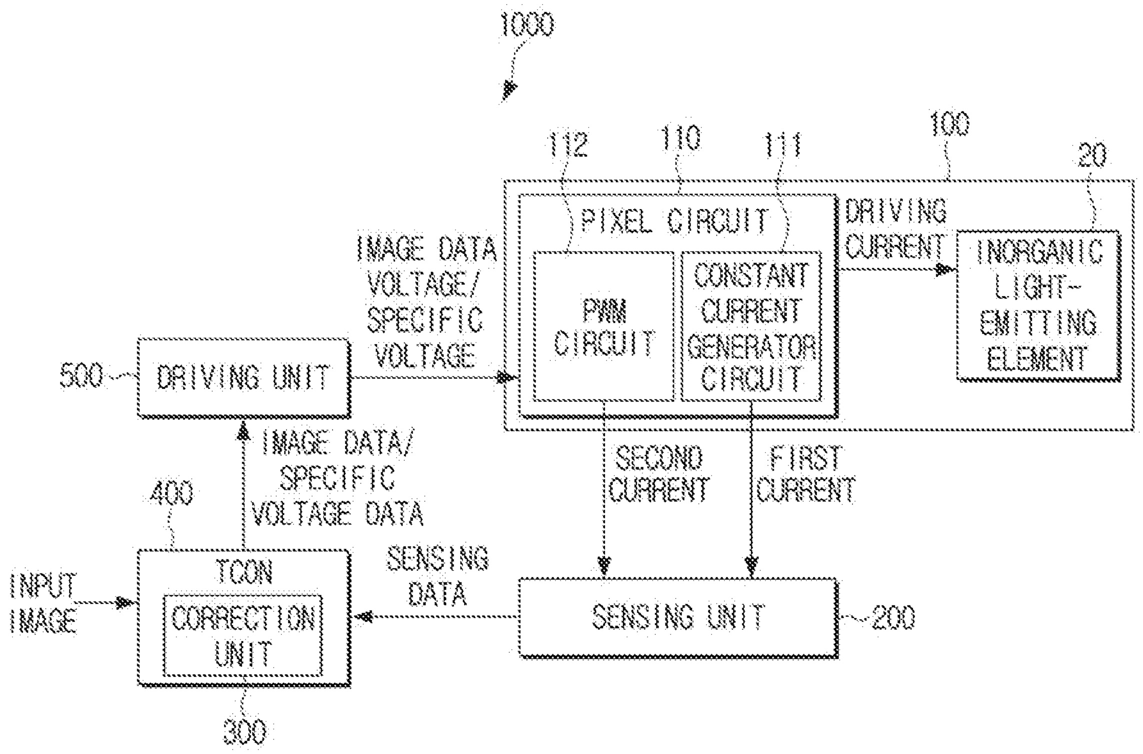
FIG. 4 is a detailed block diagram of a display apparatus, according to an embodiment.

FIG. 4 is a block diagram illustrating a display apparatus according to an embodiment of the disclosure in more detail. According to FIG. 4, the display apparatus 1000 is referred to as a display panel 100, a sensing unit 200, a correction unit 300, a timing controller 400 (hereinafter, referred to as TCON) and a driving unit 500.

The TCON 400 controls the overall operation of the display apparatus 1000. In particular, the TCON 400 may perform sensing driving and display driving of the display apparatus 1000.

Here, the sensing driving is a driving operation of updating the compensation value to compensate for the threshold voltage Vth and mobility μ of the driving transistors included in the display panel 100, and the display driving is a driving operation of displaying an image on the display panel 100 based on the image data voltage to which the compensation value is reflected.

When the display driving is performed, the TCON 400 provides image data for the input image to the driving unit 500. The image data provided to the driving unit 500 may be image data corrected by the correction unit 300.

The correction unit 300 may correct the image data for the input image based on the compensation value. The compensation value may be a compensation value obtained through sensing driving to be described later. As shown in FIG. 4, the correction unit 300 may be implemented as a function module of the TCON 400 mounted on the TCON 400. However, an embodiment is not limited thereto, and the correction unit 300 may be mounted on a separate processor different from the TCON 400, and may be implemented as a separate chip in an application specific integrated circuit (ASIC) or a field-programmable gate array (FPGA) method.

The driving unit 500 may generate an image data voltage based on the image data provided by the TCON 400, and provide the generated image data voltage to the display panel 100. Accordingly, the display panel 100 may display an image on the basis of the image data voltage provided by the driving unit 500.

When the sensing driving is performed, the TCON 400 provides specific voltage data for sensing the current flowing through the driving transistor included in one or more pixel circuits 110 to the driving unit 500.

The driving unit 500 may generate a specific voltage corresponding to the specific voltage data and provide the specific voltage to the display panel 100, and accordingly, a current based on a specific voltage flows over the driving transistor included in the pixel circuits 110 of the display panel 100.

The sensing unit 200 may sense the current flowing through the driving transistor and output the sensing data to the correction unit 300, and the correction unit 300 may obtain or update the compensation value for correcting the image data based on the sensing data.

Hereinafter, each configuration of FIG. 4 will be further described.

The display panel 100 includes an inorganic light-emitting element 20 constituting a sub pixel and pixel circuits 110 for providing a driving current to the inorganic light-emitting element 20. Referring to FIG. 4, only one sub pixel related configuration included in the display panel 100 is illustrated, but the pixel circuits 110 and the inorganic light-emitting element 20 may be provided for each sub pixel as described above.

The inorganic light-emitting element 20 may express the gray scale value of different luminance depending on the magnitude of the driving current provided from the pixel circuits 110 and the duration of the driving current, and. The term "pulse width" or "duty ratio" may be used instead of the term driving time.

For example, the inorganic light-emitting element 20 may represent a brighter gray scale value as the magnitude of the driving current is larger. Further, the inorganic light-emitting element 20 may represent a brighter gray-scale value as the driving time of the driving current increases (i.e., the longer the pulse width or the higher the duty ratio).

The pixel circuits 110 provide a driving current to the inorganic light-emitting element 20 when the display is driven. Specifically, the pixel circuits 110 may provide a driving current having a controlled magnitude and a driving time to the inorganic light-emitting element 120 based on an image data voltage (e.g., a constant current generator data voltage, a PWM data voltage) applied from the driving unit 500. In other words, the pixel circuits 110 may control the luminance of light emitted by the inorganic light-emitting element 20 by driving the inorganic light-emitting element 20 with the PAM and/or a PWM scheme.

The pixel circuits 110 may include a constant current generator circuit 111 for providing a constant current having a constant magnitude to the inorganic light-emitting element 20 based on the constant current generator data voltage, and a PWM circuit 112 for providing the constant current provided from the constant current generator circuit 111 to the inorganic light-emitting element 20 during the time corresponding to the PWM data voltage. At this time, a constant current provided to the inorganic light-emitting element 20 becomes a driving current.

Each of the constant current generator circuit 111 and the PWM circuit 112 includes a driving transistor. For convenience, the driving transistor included in the constant current generator circuit 111 is referred to as a first driving transistor, and the driving transistor included in the PWM circuit 112 is referred to as a second driving transistor.

When the sensing driving described above is performed, if a first specific voltage is applied to the constant current generator circuit 111, a first current corresponding to the first specific voltage flows over the first driving transistor, and when a second specific voltage is applied to the PWM circuit 112, a second current corresponding to the second specific voltage flows over the second driving transistor.

Accordingly, the sensing unit 200 may sense the first and second currents, respectively, and output first sensing data corresponding to the first current and second sensing data corresponding to the second current to the correction unit 300, respectively. The sensing unit 200 may include a current detector and an analog to digital converter (ADC). In this example, the current detector may be implemented using an operational amplifier (OP-AMP) and a current integrator including a capacitor, but an embodiment is not limited thereto.

The correction unit 300 may identify the sensing data value corresponding to the first specific voltage in the lookup table including the sensing data value for each voltage, compare the identified sensing data value with the first sensing data value output from the sensing unit 200, and calculate or obtain a first compensation value for correcting the constant current generator data voltage.

The correction unit 300 may identify the sensing data value corresponding to the second specific voltage in the lookup table including the sensing data value for each voltage, and compare the identified sensing data value with the second sensing data value output from the sensing unit 200 to calculate or obtain a second compensation value for correcting the PWM data voltage.

The first and second compensation values obtained as described above may be stored or updated in an internal memory or external memory of the correction unit 300, and may be used for correcting image data voltage when the display operation is performed afterwards.

To be specific, the correction unit 300, by correcting the image data to be provided to the driving unit 500 (in particular, a data driver using the compensation value, may correct the image data voltage applied to pixel circuits 110.

That is, since the data driver provides an image data voltage based on the input image data to the pixel circuits 110, the correction unit 300 may correct the image data voltage that is applied to pixel circuits 110 by correcting the image data value.

More specifically, when the display driving is performed, the correction unit 300 may correct the data value of the constant current generator among the image data based on the first compensation value. The correction unit 300 may correct the PWM data value among the image data on the basis of the second compensation value. Accordingly, the correction unit 300 may correct the constant current generator data voltage and the PWM data voltage applied to the pixel circuits 110, respectively.

The driving unit 500 drives the display panel 100. Specifically, the driving unit 500 can drive the display panel 100 by providing various control signals, data signals, power signals, and the like to the display panel 100.

In particular, the driving unit 500 may include a data driver (or source driver) for providing the image data voltage or a specific voltage to each pixel circuit 110 of the display panel 100 (see FIGS. 5A, 5B, 6, and 9 to be described below). The data driver may include a digital to analog converter (DAC) for converting the image data and specific voltage data provided by the TCON 400, respectively, to image data voltage and a specific voltage.

In addition, the driving unit 500 may include at least one scan driver (or gate driver) (see FIGS. 5A, 5B, and 9 to be described below) for providing various control signals for driving the pixel array of the display panel 100 in units of at least one row line.

The driving unit 500 may include a multiplexer (MUX) circuit for selecting each of the plurality of sub-pixels of different colors included in one pixel 10.

The driving unit 500 may include a driving voltage providing circuit for providing a driving voltage (e.g., a first driving voltage VDD_CCG, a second driving voltage VDD_PWM, a ground voltage VSS, etc. to be described below), or the like, to each pixel circuit 110 included in the display panel 100.

The driving unit 500 may include a clock signal providing circuit for providing various clock signals to a gate driver or a data driver circuit, and may include a sweep signal providing circuit for providing a sweep to be described below.

At least some of the various circuits of the driving unit 500 described above may be implemented with a separate chip form to be mounted on an external printed circuit board (PCB) together with a timing controller (TCON) 400, and may be connected to pixel circuits 110 formed on a thin film transistor (TFT) layer of the display panel 100 through the film on glass (FOG) wiring.

At least some of the various circuits of the driving unit 500 described above may be implemented in a separate chip form and arranged on a chip on film (COF) form on a film, and may be connected to pixel circuits 110 formed on the TFT layer formed on the display panel 100 through the FOG wiring.

At least some of the various circuits of the driving unit 500 described above may be implemented with a separate chip form to be arranged on a COG form (that is, arranged on a rear surface (an opposite side of a surface on which the TFT layer is formed with respect to the glass substrate) of the glass substrate (described below) of the display panel 100), and may be connected to the pixel circuits formed on the TFT layer of the display panel 100 through the connection wiring.

At least some of the various circuits of the driving unit 500 described above may be formed in the TFT layer together with the pixel circuits 100 formed in the TFT layer in the display panel 100 and may be connected to the pixel circuits 100.

For example, among various circuits of the driving unit 500 described above, the gate driver circuit, the sweep signal providing circuit, and the MUX circuit may be formed in the TFT layer of the display panel 100, the data driver circuit may be arranged on the rear surface of the glass substrate of the display panel 100, and the driving voltage providing circuit, the clock signal providing circuit, and the TCON 400 may be arranged on the external PCB, but is not limited thereto.

Figure 5A:
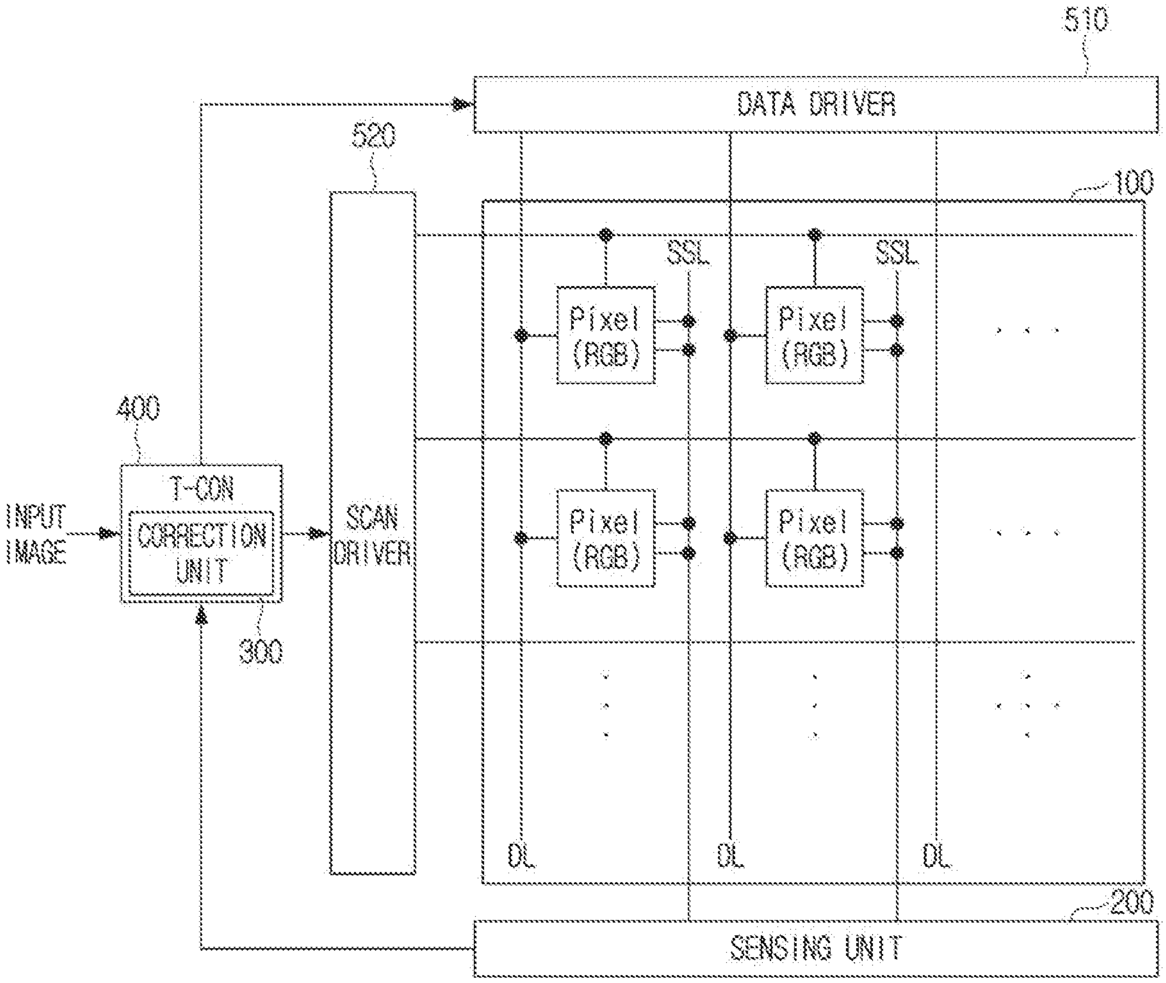
FIG. 5A illustrates an example of an implementation of a sensing unit, according to an embodiment.
Figure 5B:
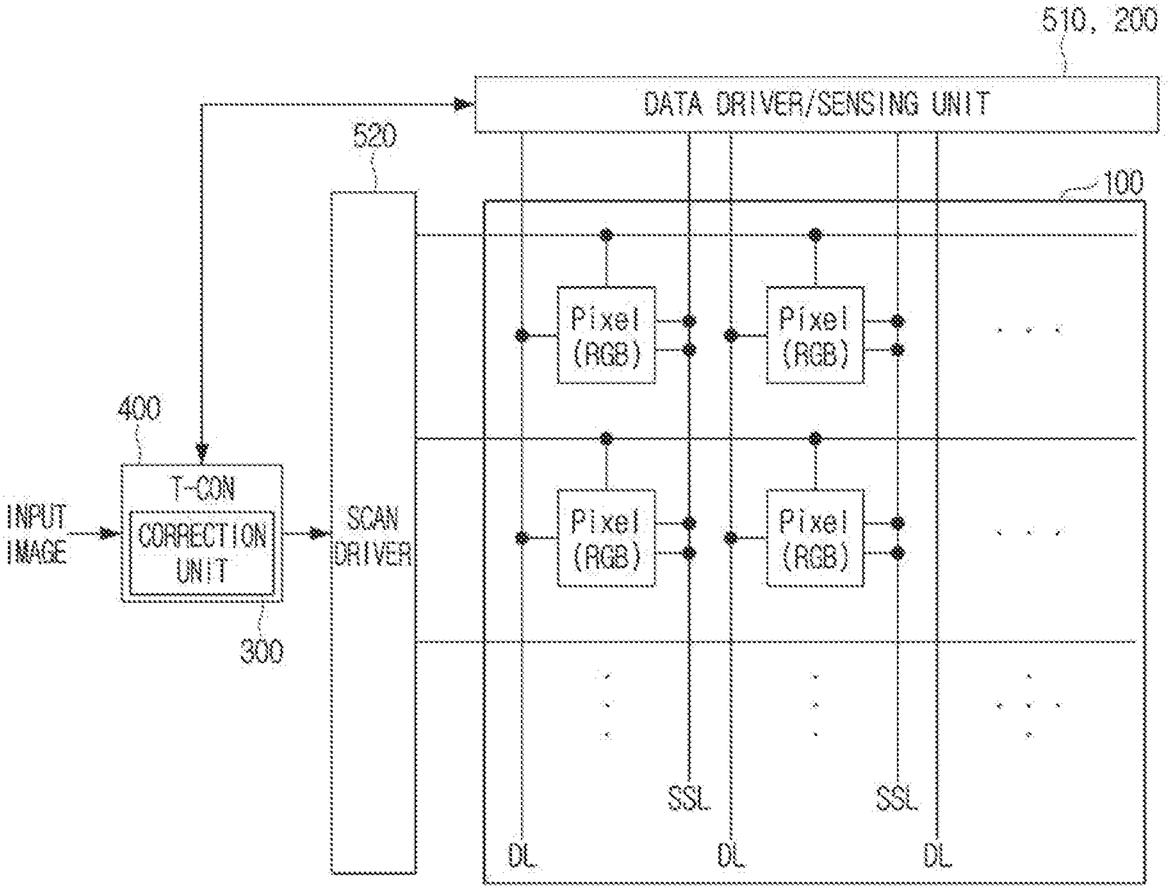
FIG. 5B illustrates an example of an implementation of a sensing unit, according to an embodiment.

FIGS. 5A and 5B are diagrams illustrating an embodiment of the sensing unit 200. Referring to FIGS. 5A and 5B, the display panel 100 includes a plurality of pixels arranged in each area where a plurality of data lines DL and a plurality of scan lines SCL cross each other in a matrix form.

At this time, each pixel may include three sub pixels, such as R, G, and B and each sub pixel included in the display panel 100 may include an inorganic light-emitting element 20 of a corresponding color and the pixel circuits 110.

The data line (DL) is a line for applying the image data voltage (specifically, a constant current generator data voltage and a PWM data voltage) and a specific voltage to each subpixel included in the display panel 100, and the scan line (SCL) is a line for selecting a pixel (or subpixel) included in the display panel 100 for each row line.

Figure 6:
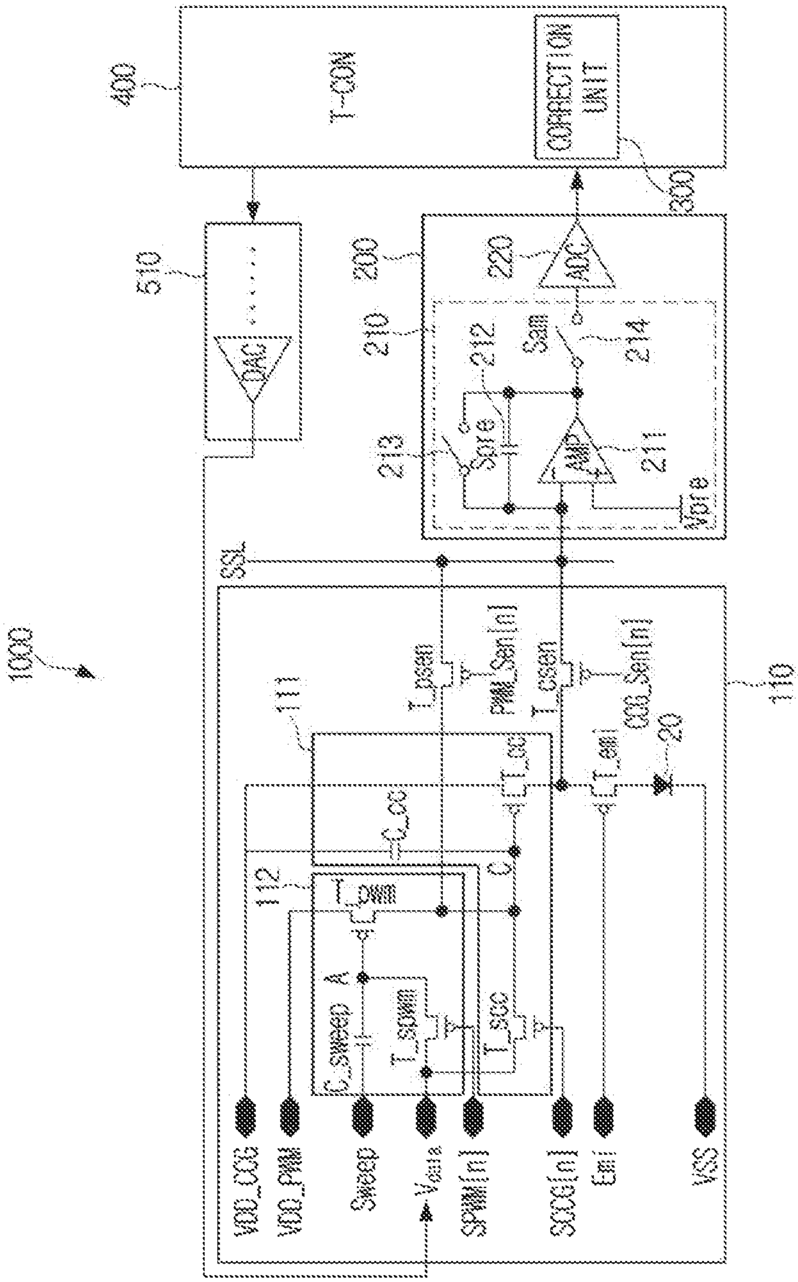
FIG. 6 is a detailed circuit diagram of pixel circuits and sensing units, according to an embodiment.
Figure 7:
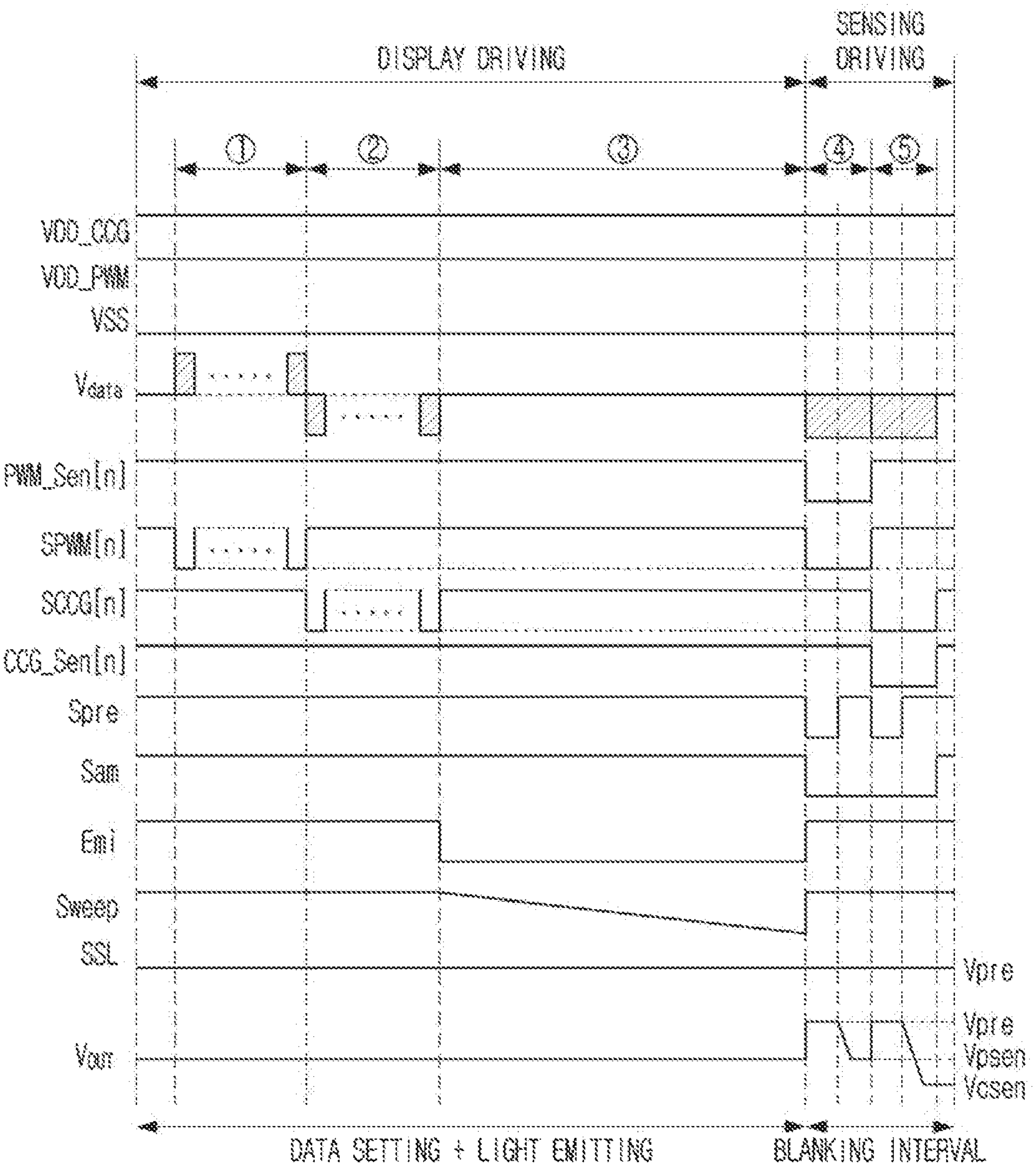
FIG. 7 is a driving timing diagram of a display apparatus, according to an embodiment.

Accordingly, the image data voltage or a specific voltage applied from the data driver 510 through the data line DL may be applied to pixel (or sub pixels) of a selected row line through a control signal (e.g., SPWM(n), SCCG(n), SP(n), etc. of FIGS. 6 and 7) applied from the scan driver 520.

The voltages (image data voltages and specific voltages) to be applied to each of the R, G, and B sub pixels may be time-division multiplexed to be applied to the display panel 100. The time-division multiplexed voltages as above may be applied to corresponding pixels through a MUX circuit.

Unlike FIGS. 5A and 5B, a separate data line may be provided for each of the R, G, and B sub pixels, and in this example, the voltages (image data voltage and specific voltage) to be applied to each of the R, G, and B sub pixels may be simultaneously applied to the corresponding sub pixels through the corresponding data line. In this example, the MUX circuit may not be required.

This is the same for the sensing line SSL. According to an embodiment, the sensing line SSL may be provided for each column line of a pixel, as shown in FIGS. 5A and 5B. In this example, a MUX circuit may be required for the operation of the sensing unit 200 for each of the R, G, and B sub pixels.

According to an embodiment, the sensing line SSL may be provided in a column line unit of sub-pixels unlike FIGS. 5A and 5B. In this case, a separate MUX circuit may not be required for the operation of the sensing unit 200 for each of the R, G, and B sub pixels. However, compared to an embodiment shown in FIGS. 5A and 5B, the unit configuration of the sensing unit 200 may be required by more than three times.

Referring to FIGS. 5A and 5B, for convenience, only one scan line is shown for one row line. However, the number of actual scan lines may vary depending on the driving method or implementation of the pixel circuits 110 included in the display panel 100. For example, six scan lines for providing each of the control signals (Sweep, SPWM(n), SCCG(n), Emi, PWM_Sen(n), CCG_Sen(n)) shown in FIG. 6 may be provided for each row line.

The first and second currents flowing through the first and second driving transistors may be transmitted to the sensing unit 200 through the sensing line SSL based on the specific voltage, as described above. Accordingly, the sensing unit 200 may sense the first and second currents, respectively, and output first sensing data corresponding to the first current and second sensing data corresponding to the second current to the correction unit 300, respectively.

According to an embodiment, the sensing unit 200 may be implemented as an IC separate from the data driver 510 as shown in FIG. 5A, or may be implemented in an IC which also includes the data driver 510, as shown by a reference numeral 700 in FIG. 5B.

As described above, the correction unit 300 may correct the constant current generator data voltage based on the first sensing data output from the sensing unit 200, and correct the PWM data voltage based on the second sensing data.

Referring to FIGS. 5A and 5B, the first and second currents are transmitted to the sensing unit 200 through a separate sensing line SSL separate from the data line DL. However, an embodiment is not limited thereto. For example, in the example in which the data driver 510 and the sensing unit 200 are implemented as one IC, as shown in FIG. 7B, the first and second currents may be transmitted to the sensing unit 200 through the data line DL without the sensing line SSL.

FIG. 6 is a detailed circuit diagram of pixel circuits 110 and a sensing unit 200 according to an embodiment. Referring to FIG. 6, the data driver 510, the correction unit 300, and TCON 400 are illustrated together.

FIG. 6 specifically illustrates a circuit related to one sub pixel, that is, a unit configuration of one inorganic light-emitting element 20, the pixel circuits 110 for driving the inorganic light-emitting element 20, and the sensing unit 200 for sensing the current flowing through the driving transistor T_cc, T_pwm included in the pixel circuits 110.

Referring to FIG. 6, the pixel circuits 110 may include the constant current generator circuit 111, a PWM circuit 112, a transistor T_emi, a transistor T_csen, and a transistor T_psen.

The constant current generator circuit 111 includes a first driving transistor T_cc of which the source terminal is connected to the driving voltage VDD_CCG, capacitor C_cc connected between the source terminal and the gate terminal of the first driving transistor T_cc and a transistor T_scc for applying a constant current generator data voltage which is controlled to be turned on or off according to the control signal SCCG(n) and applied from the data driver 510 to a gate terminal of the first driving transistor T_cc.

The PWM circuit 112 includes a second driving transistor T_pwm where the source terminal is connected to the first driving voltage VDD_PWM terminal, the capacitor C_sweep for coupling the linearly sweeping sweep voltage to the gate terminal of the second driving transistor T_pwm, and a transistor T_spwm controlled to be turned on and off according to the control signal SPWM(n) and configured to, while being turned on, apply, to the gate terminal of the second driving transistor T_pwm, the PWM data voltage applied from the data driver 510.

The drain terminal of the second driving transistor T_pwm is connected to the gate terminal of the first driving transistor T_cc.

The transistor T_emi has a source terminal connected to the drain terminal of the transistor T_cc, and a drain terminal connected to the anode terminal of the inorganic light-emitting element 20. The transistor T_emi may be turned on/off according to the control signal Emi to electrically connect and disconnect the constant current generator circuit 111 and the inorganic light-emitting element 20.

A source terminal of the transistor T_csen is connected to a drain terminal of the first driving transistor T_cc, and a drain terminal is connected to the sensing unit 200. The transistor T_csen is turned on according to the control signal CCG_Sen(n) while the sensing operation is performed, and transmits a first current flowing through the first driving transistor T_cc to the sensing unit 200 through a sensing line SSL.

A source terminal of the transistor T_psen is connected to a drain terminal of the second driving transistor T_pwm, and a drain terminal is connected to the sensing unit 200. The transistor T_psen is turned on according to the control signal PWM_Sen(n) while the sensing operation is performed, and transmits a second current flowing through the second driving transistor T_pwm to the sensing unit 200 through the sensing line SSL.

The cathode terminal of the inorganic light-emitting element 20 is connected to the ground voltage (VSS) terminal.

Referring to FIG. 6, a unit configuration of the sensing unit 200 includes a current integrator 210 and an ADC 220. According to an embodiment, the current integrator 210 may include an amplifier 211, an integration capacitor 212, a first switch 213, and a second switch 214.

At this time, the amplifier 211 may include an inverting input terminal (−) connected to the sensing line SSL to receive first and second currents flowing through the first and second driving transistors T_cc and T_pwm of the pixel circuits 110 from the sensing line SSL, and a non-inverting input terminal(+) receiving the reference voltage Vpre and an output terminal Vout.

In addition, the integration capacitor 212 may be connected between the inverting input terminal (−) of the amplifier 211 and the output terminal Vout, and the first switch 213 may be connected to both ends of the integration capacitor 212. Both ends of the second switch 214 may be connected to the output terminal Vout of the amplifier 211 and the input terminal of the ADC 220, respectively, and may be switched according to the control signal Sam.

A unit configuration of the sensing unit 200 shown in FIG. 6 may be provided for each sensing line SSL. For example, when a sensing line is provided for each column line of a pixel in the display panel 100 including 480 pixel column lines, the sensing unit 200 may include 480 unit configurations.

If a sensing line is provided for each column line of a sub-pixel in the display panel 100 including 480 pixel column lines including R, G, and B sub-pixels, the sensing unit 200 may include 1440 (=480*3) unit configurations.

FIG. 7 is a driving timing diagram of the display apparatus 1000 according to an embodiment. Specifically, FIG. 7 shows various control signals, driving voltage signals, and data signals applied to the pixel circuits 110 included in the display panel 100 during one image frame time.

Referring to FIG. 7, the display panel 100 may drive in the order of display driving and sensing driving during one image frame time.

The display driving period includes a PWM data voltage setting period ①, a constant current generator data voltage setting period ②, and a light emission period ③.

In the display driving period, a corresponding image data voltage is set in each pixel circuit 110 of the display panel 100, and each pixel circuit 110 provides a driving current corresponding to the inorganic light-emitting element 20 on the basis of the set image data voltage. Accordingly, an image is displayed by emitting light from the inorganic light-emitting element 20.

The PWM data voltage applied from the data driver 510 may be set in the PWM circuit 112 (specifically, the gate terminal of the second driving transistor (T_pwm)) of the pixel circuit 110 during the PWM data voltage setting period ①. The PWM data voltage may be applied in the order of row lines of the pixel array, and may be set in the PWM circuit 112 in the order of row lines. In the control signal SPWM(n) of FIG. 7, n in parentheses means an $n^{th}$ row line.

The constant current generator data voltage applied from the data driver 510 is set in the constant current generator circuit 111 of the pixel circuit 110 (specifically, the gate terminal of the first driving transistor T_cc) during the constant current generator data voltage setting period ②. At this time, the constant current generator data voltage may be applied from the data driver 510 in the order of the row lines of the pixel array and may be set in the constant current generator circuit 111 in the order of the row lines. That is, in the control signal SCCG(n) of FIG. 7, n in parentheses means an $n^{th}$ row line.

The light emission period ③ is a section in which the inorganic light-emitting element 20 of each sub-pixel collectively emits light on the basis of a PWM data voltage and a constant current generator data voltage set in a PWM data voltage setting period ① and a constant current generator data voltage setting period ②.

The sensing driving period includes the PWM circuit 112 sensing period ④ and the constant current generator circuit 111 sensing period ⑤.

During the PWM circuit 112 sensing period ④, the second current flowing through the second driving transistor T_pwm is transmitted to the sensing unit 200 based on the second specific voltage applied from the data driver 510.

During the constant current generator circuit 111 sensing period ⑤, the first current flowing through the first driving transistor T_cc is transmitted to the sensing unit 200 based on the first specific voltage applied from the data driver 510.

Accordingly, the sensing unit 200 may output first sensing data and the second sensing data, respectively, based on the first and second currents.

According to an embodiment, the sensing driving may be performed within a vertical blanking interval among one image frame time, as shown in FIG. 7. The vertical blanking interval refers to a time interval in which valid image data valid is not input to the display panel 100.

Accordingly, the sensing unit 200 may sense a current flowing through the driving transistor T_cc and T_pwm based on a specific voltage applied during the blanking interval of one image frame, and may output sensing data corresponding to the sensed current.

However, embodiments are not limited thereto. For example, the sensing driving may be performed during a booting period, a power-off period, or a screen-off period of a display apparatus 100. Here, the booting period refers to a period until the screen is turned on after the system power is applied, and the power-off period refers to a period until the system power is released after the screen is turned off, and the screen-off period may refer to a period where the system power is applied but the screen is turned off.

Referring to FIGS. 6 and 7, the constant current generator circuit 111 and the PWM circuit 112 may be seen to apply different separate driving voltages (that is, a first driving voltage (VDD_CCG) and a second driving voltage (VDD_PWM).

If one driving voltage (for example, VDD) is commonly used for the constant current generator circuit 111 and the PWM circuit 112, it may be problematic that the constant current generator circuit 111 using the driving voltage to apply the driving current to the inorganic light-emitting element 20 and the PWM circuit 112 for controlling only the pulse width of the driving current through the on/off control of the second driving transistor T_pwm use the same driving voltage VDD.

Specifically, the actual display panel 100 has a difference in resistance value for each area. Therefore, a difference occurs in an IR drop value for each area when a driving current flows, and a difference in the driving voltage VDD is generated according to the position of the display panel 100.

Therefore, when the PWM circuit 112 and the constant current generator circuit 111 commonly use the driving voltage VDD in the circuit structure shown in FIG. 6, an operation time point of the PWM circuit 112 is changed for each region with respect to the same PWM data voltage. This is because the on/off operation of the second driving transistor T_pwm is affected by the change of the driving voltage as the driving voltage is applied to the source terminal of the second driving transistor T_pwm.

The above problem may be solved by applying a separate driving voltage to each of the constant current generator circuit 111 and the PWM circuit 112, as shown in FIG. 6.

Even if the driving voltage of the constant current generator circuit 111 becomes different for each region of the display panel 100 as described above when the driving current flows, the driving current does not flow in the PWM circuit 112, and thus a separate driving voltage (VDD_PWM) without a difference is applied to the PWM circuit 112, so the above problem may be solved.

Hereinbelow, the operation of the display apparatus 1000 in each driving period ⓪ to ⑤ is described in more detail with reference to FIGS. 8A to 8E.

FIG. 8 is a diagram illustrating an operation of a pixel circuit 110 in the PWM data voltage setting period ①.

The PWM data voltage is applied from the data driver 510 to a data signal line (Vdata) during the PWM data voltage setting period ①.

At this time, the transistor T_spwm is turned on according to the control signal SPWM(n), and a corresponding PWM data voltage is input or set to the gate terminal (hereinafter, A node) of the second driving transistor T_pwm.

Figure 8A:
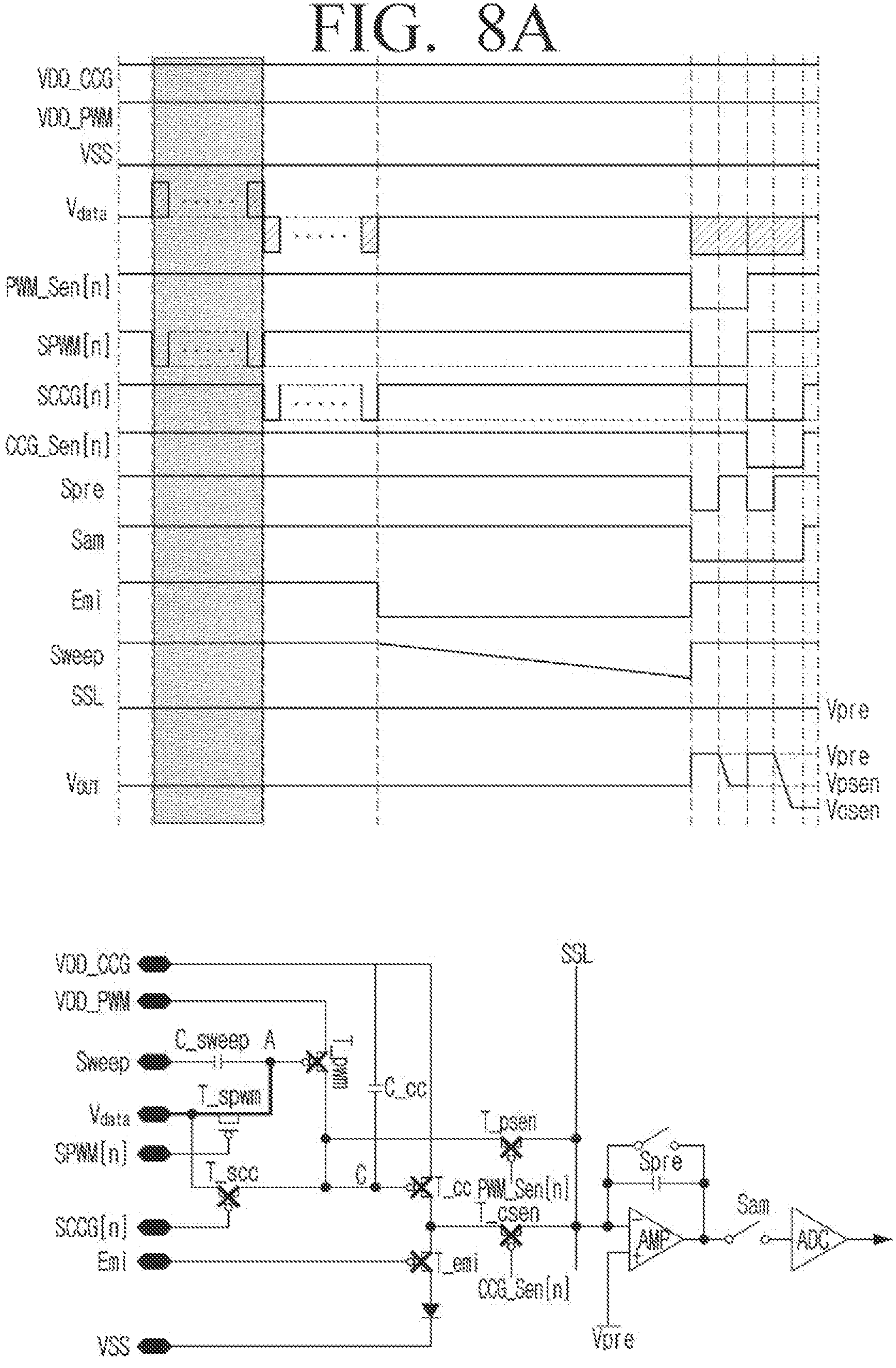
FIG. 8A is a diagram illustrating an operation of a pixel circuit in the PWM data voltage setting period, according to an embodiment.

The PWM data voltage may be a voltage within a voltage range equal to or greater than the sum of the second driving voltage VDD_PWM and the threshold voltage Vth_pwm of the second driving transistor T_pwm. Therefore, as shown in FIG. 8A, except when the PWM data voltage is a voltage corresponding to the full black grayscale, the second driving transistor T_pwm maintains an off state in a state in which the PWM data voltage is set in the A node.

For example, if the display panel 100 is composed of 270 row lines, the PWM data voltage setting operation may be repeated 270 times in the order of each row line.

Figure 8B:
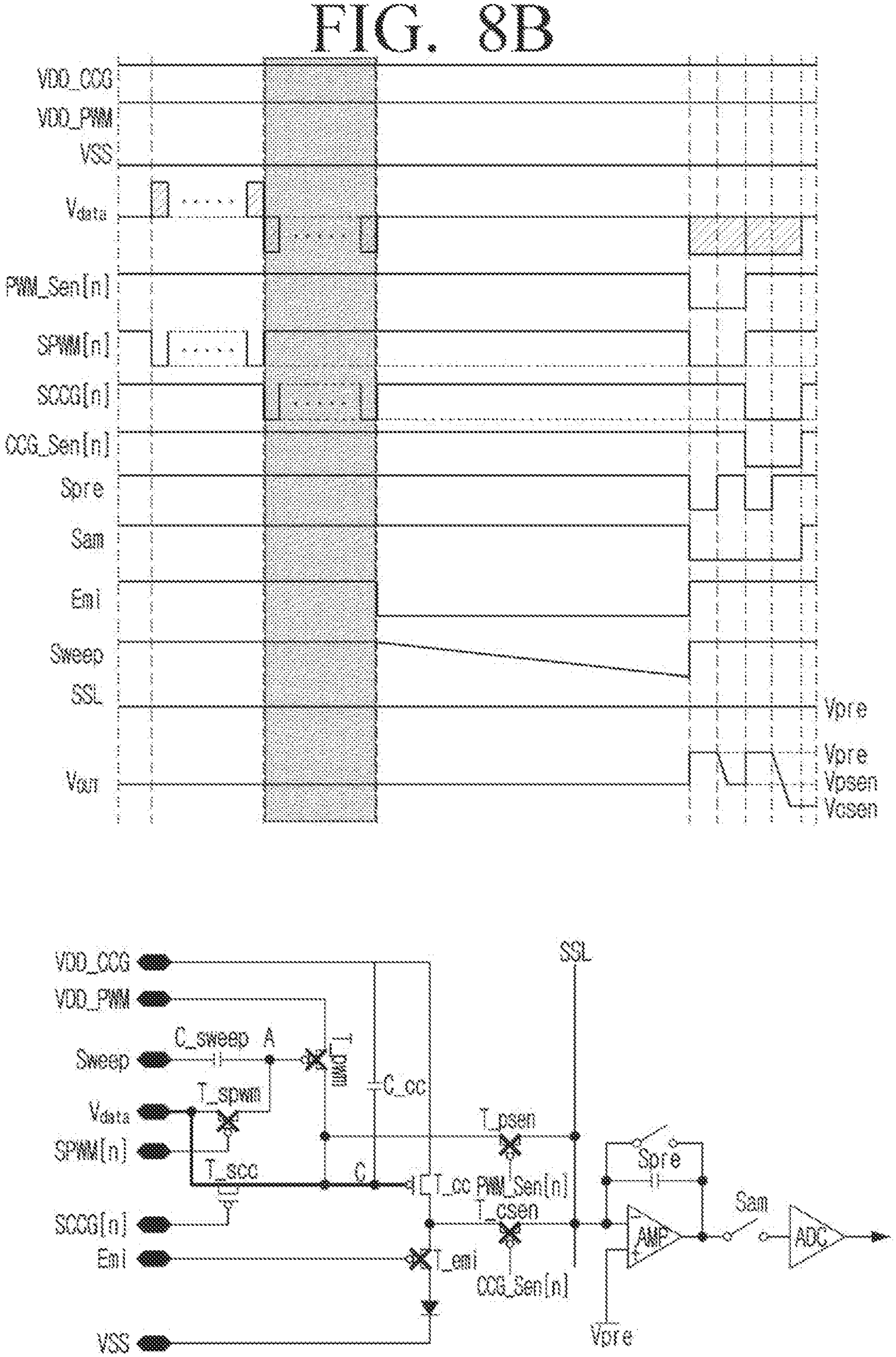
FIG. 8B is a diagram illustrating an operation of a pixel circuit in constant current generator data voltage setting period, according to an embodiment.

FIG. 8B is a diagram illustrating an operation of the pixel circuit 100 in constant current generator data voltage setting period ②.

During the constant current generator data voltage setting period ②, a constant current generator data voltage is applied from the data driver 510 to the data signal line Vdata.

At this time, the transistor T_scc is turned on according to the control signal SCCG(n), and the constant current generator data is input or set to the gate terminal (hereinafter, C node) of the first driving transistor T_cc through the turned-on transistor T_scc.

The constant current generator data voltage may be a voltage within a voltage range less than the sum of the first driving voltage VDD_CCG and the threshold voltage Vth_cc of the first driving transistor T_cc. Therefore, in a state in which the constant current generator data voltage is set in the C node, the first driving transistor T_cc maintains a turned-on state.

The constant current generator data voltage setting operation may be repeated 270 times in the order of each row line when the display panel 100 is composed of 270 row lines.

Figure 8C:
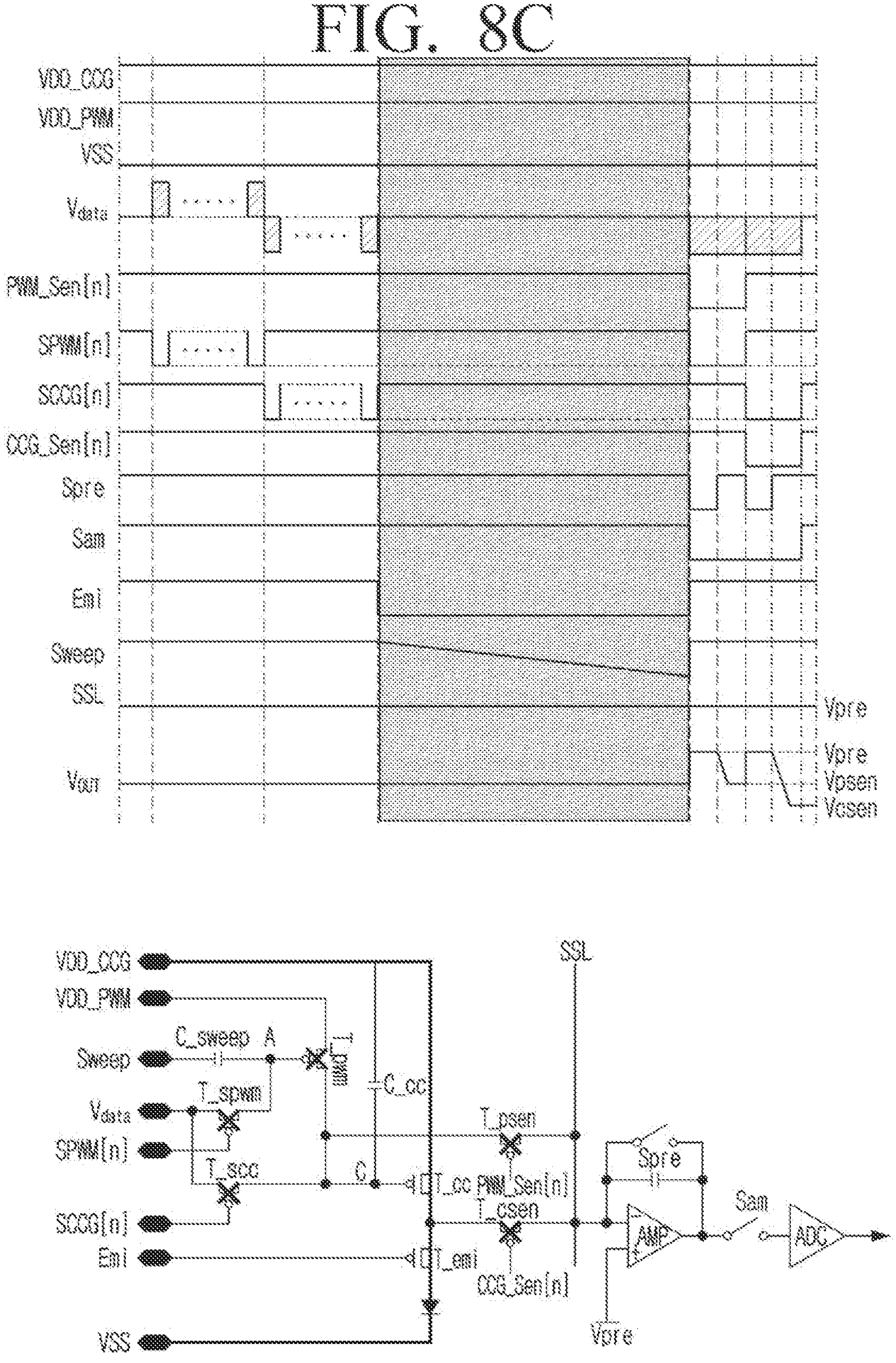
FIG. 8C is a diagram illustrating an operation of a pixel circuit in a light emission period, according to an embodiment.

FIG. 8C is a diagram illustrating an operation of the pixel circuit 100 in a light emission period ③.

When the light emission period starts, the transistor T_emi is turned on according to the control signal Emi, and the turned-on state is maintained during the light emission period. In addition, as described with reference to FIG. 8B, the second driving transistor T_cc is in the turned-on state in a state in which the constant current generator data voltage is set in the C node.

Therefore, when an emission period starts, a first driving voltage VDD_CCG is applied to an anode terminal of the inorganic light-emitting device 20 through a first driving transistor T_cc and a transistor T_emi.

Accordingly, a driving current having a magnitude corresponding to a magnitude of a voltage applied between a gate terminal and a source terminal of the first driving transistor T_cc flows through the inorganic light-emitting element 20, and the inorganic light-emitting element 20 starts to emit light.

When the light emission section starts, a sweep voltage Sweep, which is a linearly decreasing voltage, is coupled to the A node through a capacitor C_sweep. Therefore, the voltage of the A node decreases according to the change of the sweep voltage.

When the decreasing voltage value of the A node becomes equal to the sum of the second driving voltage VDD_PWM and the threshold voltage Vth_pwm of the second driving transistor T_pwm, the second driving transistor T_pwm maintaining the turned-off state is turned on, and the second driving voltage VDD_PWM is applied to the C node through the turned-on second driving transistor T_pwm.

Accordingly, the first driving transistor T_cc is turned off, the driving current stops the flow, and the inorganic light-emitting element 20 also stops emitting light. This is because the voltage between the gate terminal and the source terminal of the first driving transistor T_cc becomes larger than the threshold voltage Vth_cc of the first driving transistor T_cc by applying the second driving voltage VDD_PWM to the C node. (For example, even if a voltage having the same magnitude is used for the first driving voltage VDD_CCG and the second driving voltage VDD_PWM, the threshold voltage Vth_cc of the first driving transistor T_cc has a negative value, and the first driving transistor T_cc is turned off when the second driving voltage VDD_PWM is applied to the node C.)

That is, in various embodiments of the disclosure, the driving current flows until the voltage value of the A node is changed according to the sweep voltage from the start of the light-emitting period until the second driving transistor T_pwm is turned on.

Therefore, according to various embodiments of the disclosure, the duration of the driving current, that is, the light emission time of the inorganic light-emitting element 20, may be controlled by adjusting the PWM data voltage value set in the A node.

If the PWM data voltage has a voltage value corresponding to the full black gray scale, the second driving transistor T_pwm may be turned on in a state where the PWM data voltage is set in the A node. Accordingly, the second driving voltage VDD_PWM is applied to the C node, and the first driving transistor T_cc is also not turned on from the first. Accordingly, even when the light emission period starts, the driving current does not flow in the inorganic light-emitting element 20.

Figure 8D:
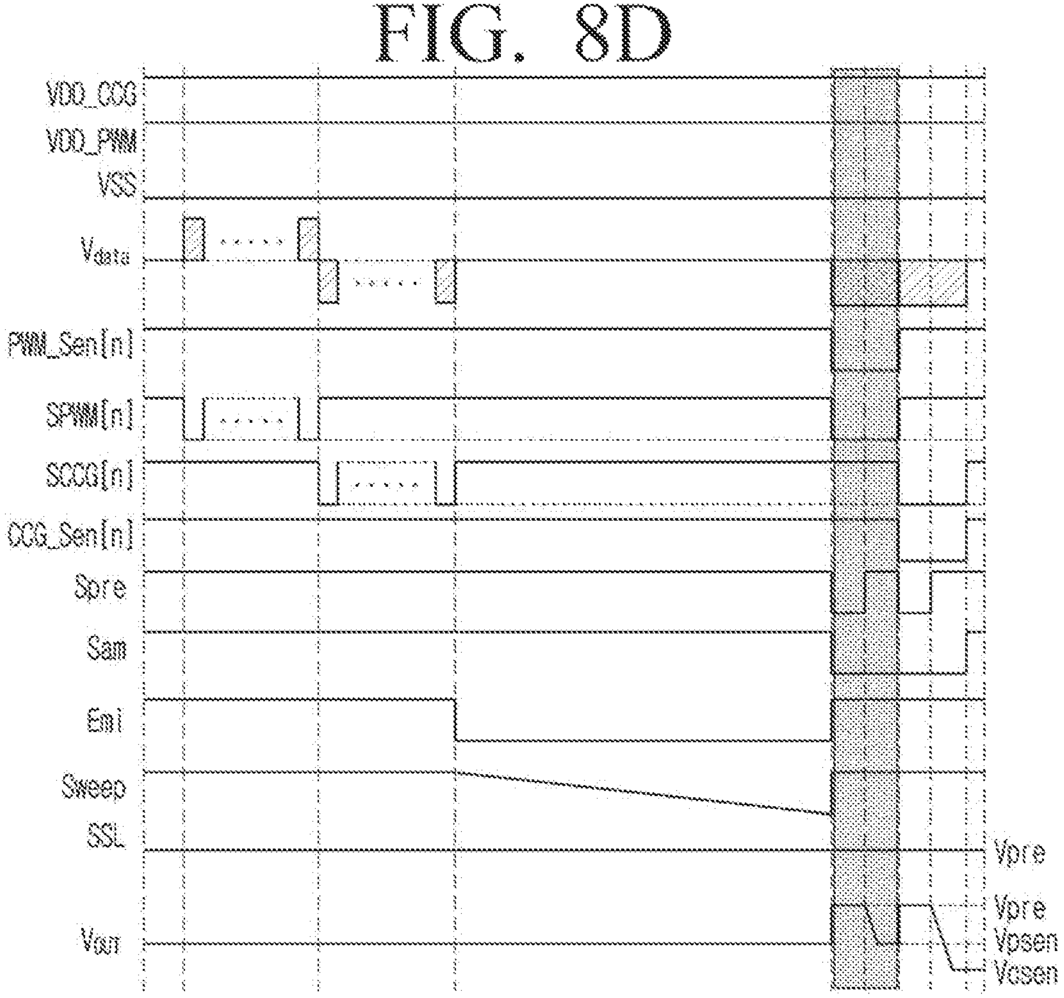
FIG. 8D is a diagram illustrating an operation of a pixel circuit and a driving unit in the PWM circuit sensing period, according to an embodiment.
Figure 8D:
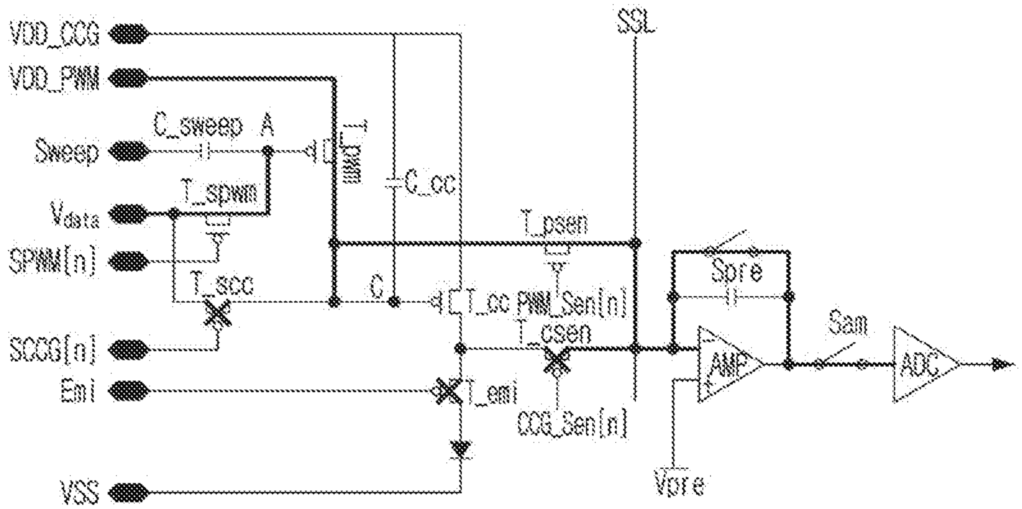
Figure 8E:
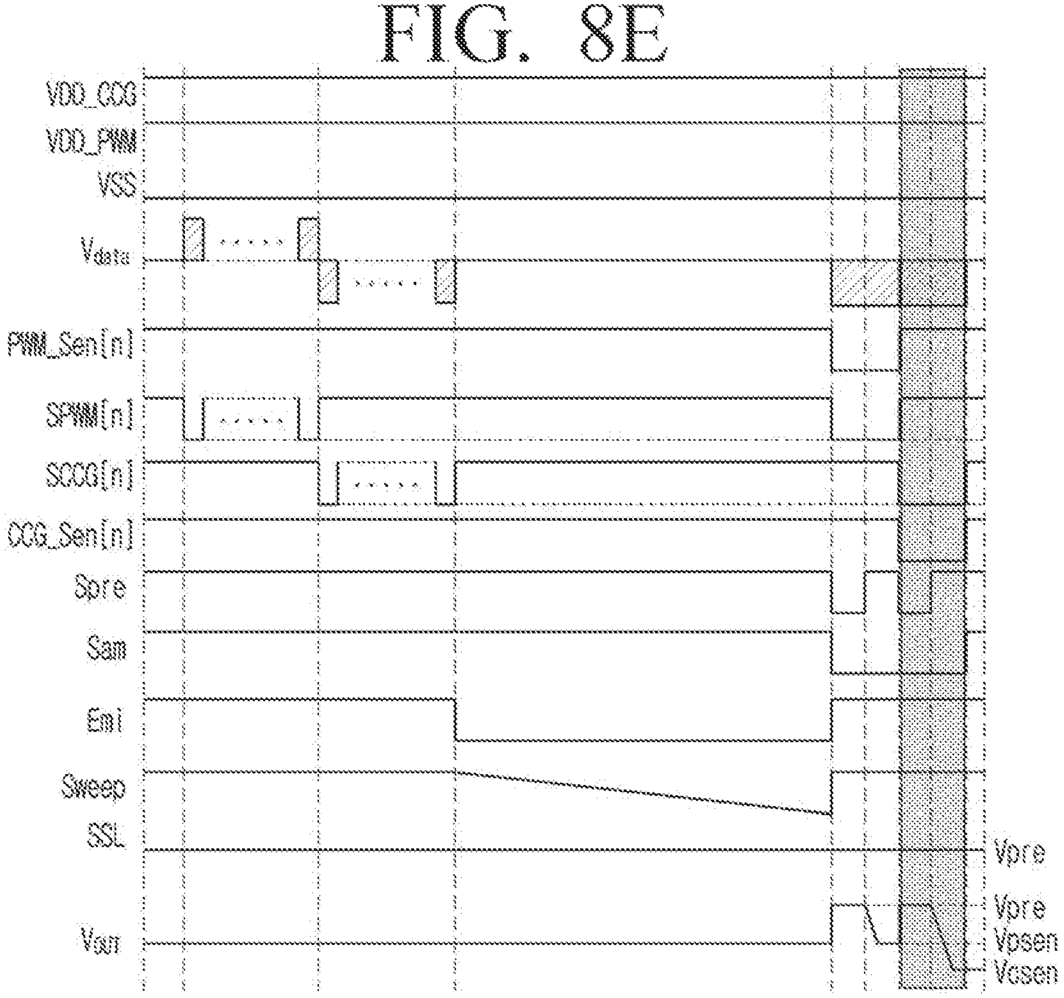
FIG. 8E is a diagram illustrating an operation of a pixel circuit and a driving unit of the constant current generator circuit sensing period, according to an embodiment.
Figure 8E:
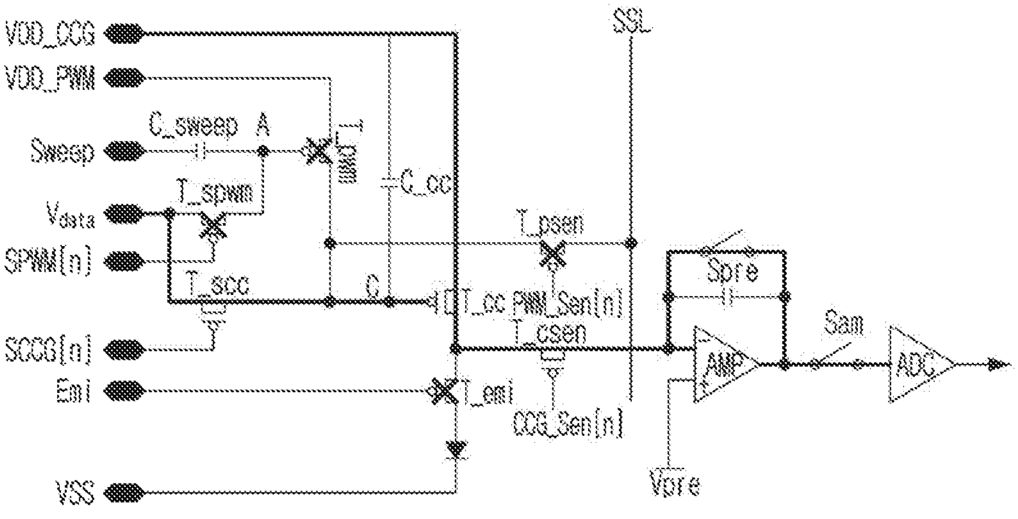

FIG. 8D is a diagram illustrating an operation of the pixel circuit 110 and a driving unit 500 in the PWM circuit sensing period ④.

During the PWM circuit 112 sensing period, a second specific voltage is applied from the second data driver 510 to the data signal line Vdata. The second specific voltage may be any predetermined voltage for turning on the second driving transistor T_pwm. The transistor T_spwm is turned on according to the control signal SPWM(n), and the second specific voltage is inputted to the A node through the turned-on transistor T_spwm.

The transistor T_psen is turned on according to the control signal PWM_Sen (n) in the PWM sensing period, and the second current flowing through the second driving transistor T_pwm is transmitted to the sensing unit 200 through the turned-on transistor T_psen.

During the PWM circuit 112 sensing period, the first switch 213 of the sensing unit 200 is turned on and off according to the control signal Spre. Hereinafter, a period in which the first switch 213 is turned on within the PWM circuit 112 sensing period is referred to as a first initialization period, and a period in which the first switch 213 is turned off is referred to as a first sensing period.

Since the first switch 213 is turned on in the first initialization period, the reference voltage Vpre input to the non-inverting input terminal+ of the amplifier 211 is maintained in the output terminal Vout of the amplifier 211.

Since the first switch 213 is turned off in the first sensing period, the amplifier 211 operates as a current integrator to integrate the second current. The voltage difference between both ends of the integration capacitor 212 due to the second current flowing through the inverting input terminal (–) of the amplifier 211 in the first sensing period increases as the sensing time elapses, that is, the amount of charge accumulated increases.

However, according to the virtual ground characteristic of the amplifier 211, the voltage of the inverting input terminal (–) in the first sensing period is maintained at the reference voltage Vpre regardless of the increase in the voltage difference of the integration capacitor 212, so that the voltage of the output terminal Vout of the amplifier 211 is lowered in response to the voltage difference between both ends of the integration capacitor 212.

In this principle, the second current flowing into the sensing unit 200 in the first sensing period is accumulated as an integral value Vpsen, which is a voltage value, through the integration capacitor 212. Since the drop slope of the voltage of the output terminal Vout of the amplifier 211 increases as the second current increases, the magnitude of the integral value Vpsen becomes smaller as the second current increases.

The integration value Vpsen is input to the ADC 220 while the second switch 214 is maintained in the power-on state in the first sensing period, and is converted into the second sensing data in the ADC 220 and output to the correction unit 300.

8E is a diagram illustrating an operation of the pixel circuit 110 and the driving unit 500 of the constant current generator circuit sensing period ⑤.

During the constant current generator circuit 111 sensing period, a first specific voltage is applied from the first data driver 510 to the data signal line Vdata. The first specific voltage is a predetermined voltage for turning on the first driving transistor T_cc. The transistor T_scc is turned on according to the control signal SCCG(n), and the first specific voltage is input to the C node through the turned-on transistor T_scc.

In the sensing period of the constant current generator circuit 111, the transistor T_csen is turned on according to the control signal CCG_Sen(n), and the first current flowing through the first driving transistor T_cc is transmitted to the sensing unit 200 through the turned-on transistor T_csen.

Even during the constant current generator circuit 111 sensing period, the first switch 213 of the sensing unit 200 is turned on and off according to the control signal Spre. Hereinafter, the period in which the first switch 213 is turned on in the constant current generator circuit 111 sensing period is referred to as the second sensing period, and the turned-off period is referred to as the second sensing period.

In the second initialization period, since the first switch 213 is turned on, the reference voltage Vpre input to the non-inverting input terminal+ of the amplifier 211 is maintained in the output terminal Vout of the amplifier 211.

Since the first switch 213 is turned off in the second sensing period, the amplifier 211 operates as a current integrator to integrate the first current. The voltage difference between both ends of the integration capacitor 212 due to the first current flowing into the inverting input terminal (–) of the amplifier 211 in the second sensing period increases as the sensing time passes, that is, as the amount of charge accumulated increases.

However, due to the virtual ground characteristics of the amplifier 211, the voltage of the inverting input terminal (–) in the second sensing period is maintained at the reference voltage Vpre regardless of the increase in the voltage difference of the integration capacitor 212, so that the voltage of the output terminal Vout of the amplifier 211 is lowered in response to the voltage difference between both ends of the integration capacitor 212.

In this principle, the first current flowing into the sensing unit 200 in the second sensing period is accumulated as an integral value Vcsen, which is a voltage value through the integration capacitor 212. Since the descent gradient of the voltage of the output terminal Vout of the amplifier 211 increases as the first current increases, the magnitude of the integrated value Vcsen becomes smaller as the first current increases.

The integration value Vcsen is input to the ADC 220 while the second switch 214 is maintained to be the power-on state in the second sensing period, and is converted into the first sensing data from the ADC 220 and then output to the correction unit 300.

Accordingly, as described above, the correction unit 300 may obtain first and second compensation values based on the first and second sensing data, and store and update the obtained first and second compensation values in a memory. When the display operation is performed, the correction unit 300 may correct the constant current generator data voltage and the PWM data voltage to be applied to the pixel circuits 110 based on the first and second compensation values, respectively.

According to an embodiment, the first specific voltage and the second specific voltage may be applied to pixel circuits of one row line per one image frame. That is, according to an embodiment, the sensing driving may be performed on one row line per one image frame. The sensing driving described above may be sequentially performed in the order of the row lines.

For example, if the display panel 100 is composed of 270 row lines, the above-described sensing driving for the pixel circuits included in the first row line with respect to the first image frame is performed, and the above-described sensing driving for the pixel circuits included in the second row line may be performed with respect to the second image frame.

In this manner, sensing driving for the pixel circuits included in the $270^{th}$ row line with respect to the $270^{th}$ image frame is performed in the same manner as described above, so that the sensing driving for all pixel circuits included in the display panel 100 may be completed once.

According to an embodiment, the first specific voltage and the second specific voltage may be applied to pixel circuits of a plurality of row lines per one image frame. According to an embodiment, the sensing driving described above with respect to the plurality of row lines per image frame may be performed. In this example, the sensing driving described above may proceed in the order of row lines.

For example, when it is assumed that the display panel 100 includes 270 row lines and the sensing driving is performed for three row lines per one image frame, the above-described sensing driving for the pixel circuits included in the row line 1 to 3 for the first image frame may be performed, and the above-described sensing driving for the pixel circuits included in the row line from 4 to 6 for the second image frame may be performed.

In this manner, by performing the above-described sensing driving for the pixel circuits included in the row line No. 268 to 270 with respect to the 90th image frame, the sensing driving for all pixel circuits included in the display panel 100 may be completed once. Therefore, in this case, when the driving of the 270$^{th}$ image frame is completed, the sensing driving described above with respect to the entire pixel circuits included in the display panel 100 is completed three times.

The driving section related to the image data voltage setting is performed in the order of the PWM data voltage setting period ① and the constant current generator data voltage setting period ②, but the embodiment is not limited thereto, and according to an embodiment, the constant current generator data voltage setting period ② may be performed first and then the PWM data voltage setting period ① may be performed later.

The sensing driving in the order of the PWM circuit 112 sensing period ④ and the constant current generator circuit 111 sensing period ⑤ is described as an example, but an embodiment is not limited thereto, and according to an embodiment, the constant current generator circuit 111 sensing period ⑤ may proceed first and then the PWM circuit 112 sensing period ④ may proceed later.

In addition, that the sensing driving is performed after the display driving is described as an example, but an embodiment is not limited thereto and according to an embodiment, the sensing driving may be performed first and then display driving may be performed afterwards.

Figure 9A:
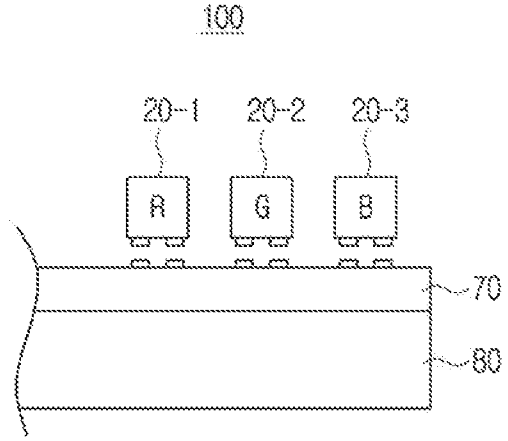
FIG. 9A is a cross-sectional view of a display panel, according to an embodiment.

FIG. 9A is a cross-sectional view of the display panel 100 according to an embodiment. Referring to FIG. 9A, one pixel included in the display panel 100 is illustrated for convenience.

Referring to FIG. 9A, the display panel 100 includes a glass substrate 80, a TFT layer 70, and inorganic light-emitting elements R, G, B (20-1, 20-2, and 20-3). The pixel circuit 110 described above may be embodied as a TFT, and may be included in the TFT layer 70 on the glass substrate 80.

Each of the inorganic light-emitting elements R, G, B (20-1, 20-2, and 20-3) may be mounted on the TFT layer 70 to be electrically connected to the corresponding pixel circuit 110 to configure the sub pixel described above.

Although not illustrated, in the TFT layer 70, the pixel circuit 110 providing a driving current to the inorganic light-emitting elements (20-1, 20-2, 20-3) exists for each of the inorganic light-emitting elements (20-1, 20-2, 20-3), and each of the inorganic light-emitting elements (20-1, 20-2, 20-3) may be mounted or placed on the TFT layer 70, respectively, so as to be electrically connected with the corresponding pixel circuit 110.

Referring to FIG. 9A, the inorganic light-emitting element R, G, B (20-1, 20-2, 20-3) is a micro LED in a flip chip type. An embodiment is not limited to thereto, and according to an embodiment, the inorganic light-emitting elements R, G, B (20-1, 20-2, 20-3) may be a lateral type or a vertical type of micro LED.

Figure 9B:
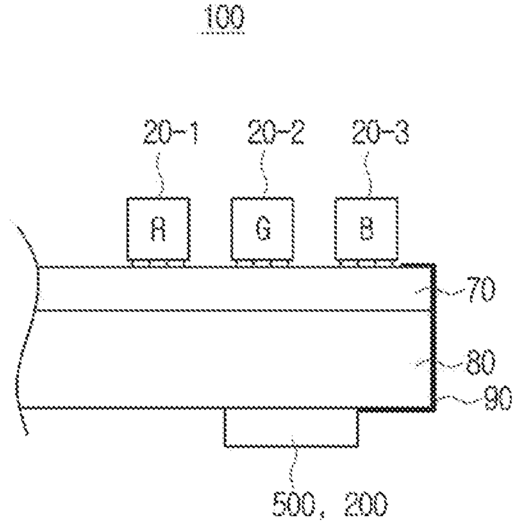
FIG. 9B is a cross-sectional view of a display panel, according to an embodiment.

FIG. 9B is a cross-sectional view of the display panel 100 according to an embodiment.

Referring to FIG. 9B, the display panel 100 may include the TFT layer 70 formed on one surface of the glass substrate 80, the inorganic light-emitting elements R, G, B (20-1, 20-2, 20-3) mounted on the TFT layer 70, the driving unit 500 and the sensing unit 200, and a connection wire 90 for electrically connecting the pixel circuit 110 and the driving unit 500 and sensing unit 200 formed on the TFT layer 70.

As described above in FIG. 4, according to an embodiment, at least some of the various circuits that may be included in the driving unit 500 may be implemented in a separate chip form to be arranged on a rear surface of the glass substrate 80 and may be connected to the pixel circuits 110 formed on the TFT layer 70 through the connection wire 90.

Referring to FIG. 9B, the pixel circuits 110 included in the TFT layer 70 may be electrically connected to the driving unit 500 through the connection wire 90 formed on an edge (or side) of the TFT panel (hereinafter, the TFT layer 70 and the glass substrate 80 in combination is called the TFT panel).

A reason of forming the connection wire 90 in the edge area of the display panel 100 to connect the pixel circuits 110 and the driving unit 500 included in the TFT layer 70 is that, when connecting the pixel circuits 110 and the driving unit 500 by forming a hole penetrating the glass substrate 80, there may be a problem such as crack in the glass substrate 80 due to the temperature difference between the manufacturing process of the TFT panel (70, 80) and the process of filling the hole with a conductive.

It has been described that the pixel circuits 110 are implemented in the TFT layer 70. However, an embodiment is not limited thereto. According to an embodiment, when the pixel circuits 110 are implemented, the pixel circuit chip in the form of an ultra-small micro chip may be implemented in a sub pixel unit or pixel unit without using the TFT layer 70, and the pixel circuit chip may be mounted on the substrate 80.

For example, the display panel 100 may be implemented in such a manner that a R pixel circuit chip is disposed next to the R inorganic light-emitting element 20-1, G pixel circuit chip is disposed next to the G inorganic light-emitting element 20-2, or a B pixel circuit chip is disposed next to the B inorganic light-emitting element 20-3, or R, G, and B pixel circuit chips are arranged or mounted on the substrate 80 next to the R, G, and B inorganic light-emitting elements 20-1 to 20-3.

Also, although an example in which the pixel circuit 110 is implemented as a P-type TFT has been described above, various embodiments described above may also be applied to the N-type TFT.

According to various embodiments, the TFT forming the TFT layer (or the TFT panel) is not limited to a specific structure or type. In other words, the TFT recited in various examples may be implemented as a low temperature poly silicon (LTPS) TFT, an oxide TFT, a poly silicon or a-silicon TFT, an organic TFT, and a graphene TFT, or the like, and may be applied to a P type (or N-type) MOSFET in a Si wafer CMOS process.

Figure 10A:
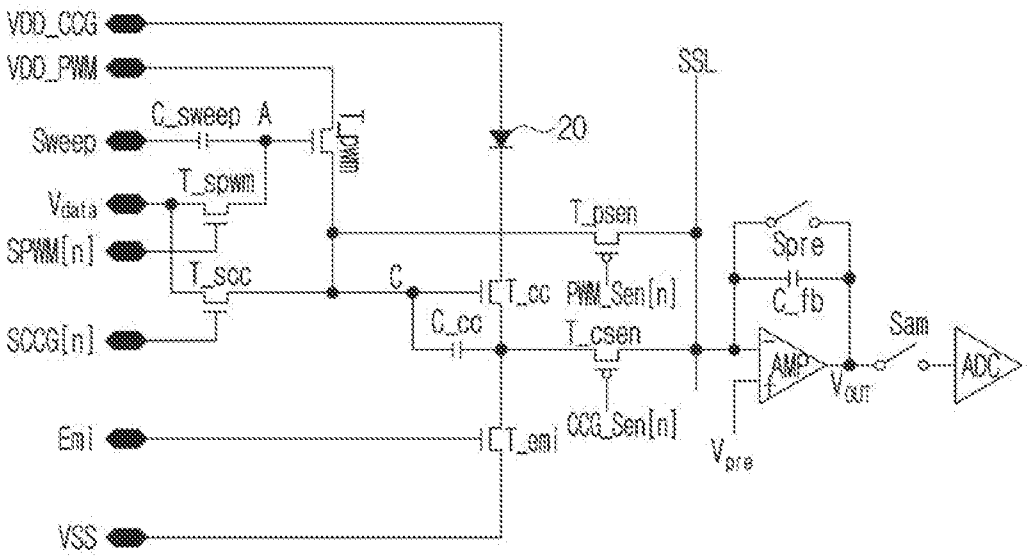
FIG. 10A is a circuit diagram of a pixel circuit, according to another embodiment.
Figure 10B:
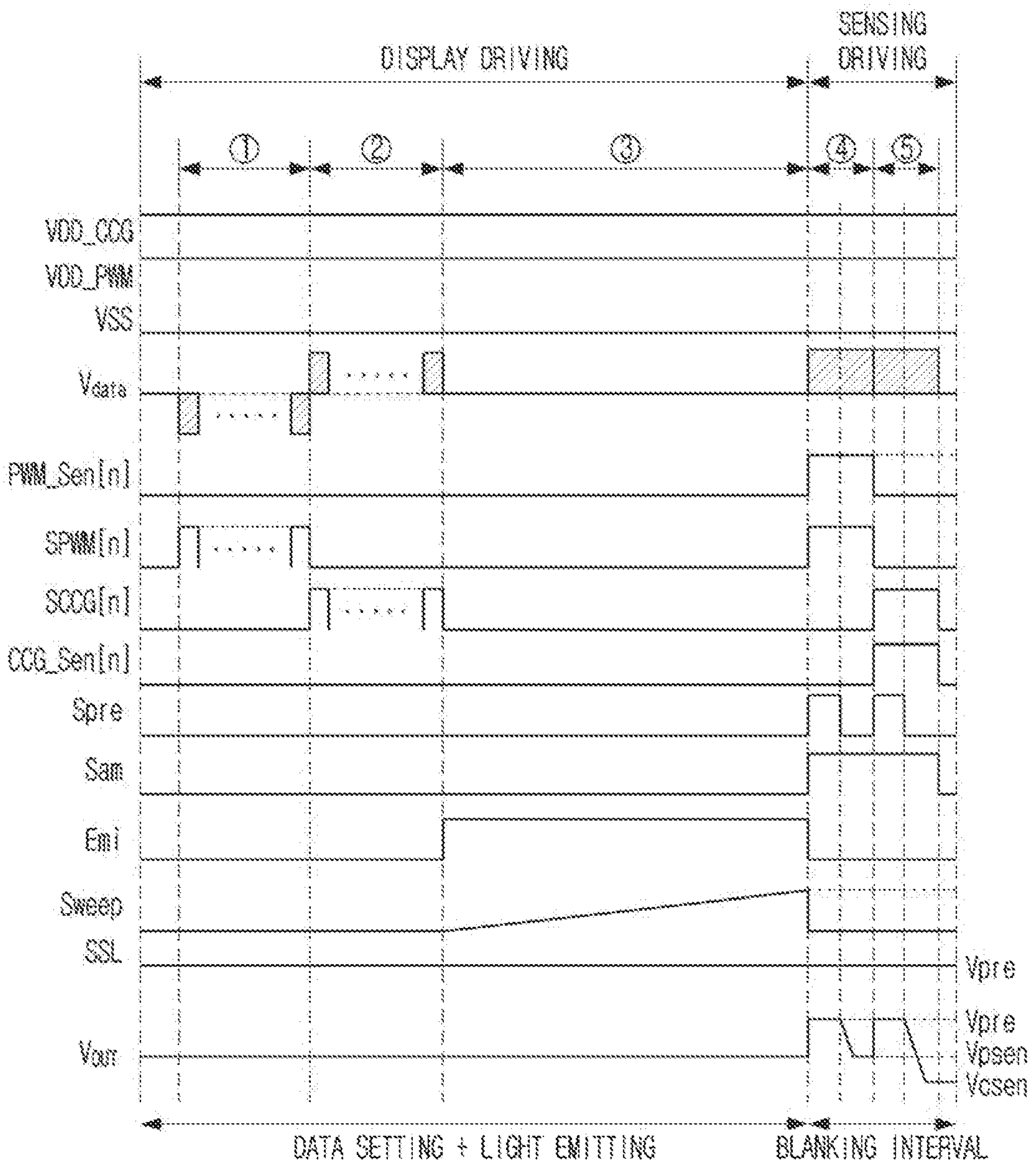
FIG. 10B is a driving timing diagram of a display apparatus including a pixel circuit of FIG. 10A, according to an embodiment.

FIGS. 10A and 10B are circuit diagrams 110 when the TFT included in the pixel circuit 110 is composed of oxide TFT and the driving timing diagram of the circuit.

The TFTs shown in FIG. 10A are all N-type oxide TFTs. Therefore, the pixel circuit of FIG. 10A has the same structure as the pixel circuit shown in FIG. 6, except that due to the type difference of the TFT, the inorganic light-emitting element 20 has an anode common structure and the capacitor C_cc is disposed between the gate terminal and the source terminal of the first driving transistor T_cc.

For various driving signals as illustrated in FIG. 10B, except the difference of polarity of signals due to the difference in the TFT type, the signals are the same as FIG. 7.

Therefore, the circuit diagram shown in FIG. 10A and the timing diagram shown in FIG. 10B may be sufficiently understood through the above-described descriptions of the P-type transistor.

In the case of the oxide TFT, since the reaction speed is faster than that of the a-Si TFT, high resolution may be clearly implemented. Since the reaction speed is fast, integration is possible and the bezel may be made thin. In addition, the manufacturing process is simple compared to the LTPS TFT, thereby reducing costs for building a production line. In addition, an embodiment has high uniformity compared to LTPS and is advantageous in making large panels since a separate crystallization process is not required like LTPS.

The display panel 100 according to various embodiments may be applied to a wearable device, a portable device, a handheld derive as a single unit and various electronic products or electronic part products requiring a display. In addition, the plurality of display panels 100 may be assembled and arranged to be applied to a display apparatus such as a monitor for a personal computer (PC), a high-resolution TV, a signage, and an electronic display.

Figure 11:
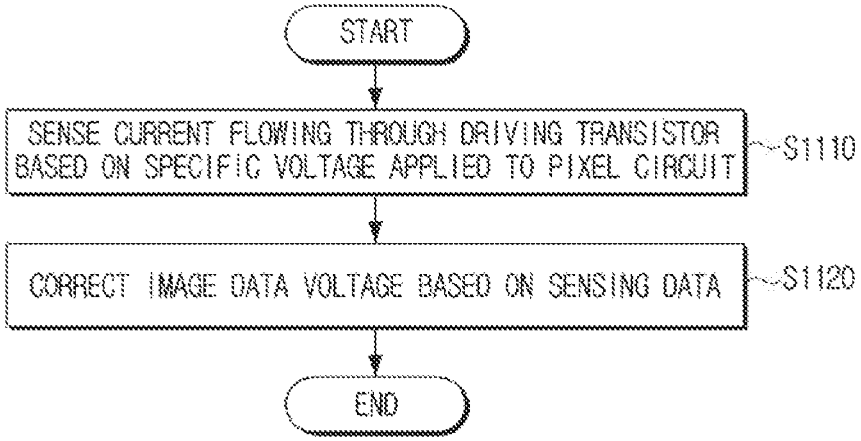
FIG. 11 is a flowchart of a method of controlling a display apparatus according to an embodiment.

FIG. 11 is a flowchart of a control method of the display apparatus 1000 according to an embodiment. In describing FIG. 11, a redundant description will be omitted.

According to FIG. 11, the display apparatus 1000 may sense a current flowing through a driving transistor included in the pixel circuit 110 on the basis of a specific voltage applied to the pixel circuit 110 of the display panel 100 in operation S1110.

At this time, according to an embodiment of the disclosure, the display apparatus 1000 may sense a current flowing through the driving transistor on the basis of a specific voltage applied during a blanking interval of one image frame.

According to an embodiment of the disclosure, a specific voltage may be applied to pixel circuits corresponding to one pixel line of the pixel array per one image frame. According to another embodiment of the disclosure, a specific voltage may be applied to pixel circuits corresponding to a plurality of pixel lines of the pixel array per one image frame.

The display apparatus 1000 may correct an image data voltage applied to the pixel circuit 110 based on sensing data corresponding to the sensed current as described above in operation S1120.

According to various embodiments as described above, the wavelength of light emitted by the inorganic light-emitting element may be prevented from being changed according to the gray scale. According to various embodiments as described above, the wavelength of light emitted by the inorganic light-emitting element may be prevented from being changed according to the gray scale. The stains on the image that may appear due to threshold voltage and mobility difference between driving transistors, may be easily compensated. In addition, the color correction is facilitated. In the case of forming a display panel having one large TFT backplane by combining the module-type display panels, or forming one large display panel, the stain compensation and color correction may be more easily performed. An optimized driving circuit may be designed, and the inorganic light-emitting element may be stably and efficiently driven.

The various embodiments described above may be implemented as software including instructions stored in a machine-readable storage media which is readable by a machine (e.g., a computer). The device may include the display apparatus 1000 according to the disclosed embodiments, as a device which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

According to an embodiment of the disclosure, the method according to the various embodiments described herein may be provided while being included in a computer program product. The computer program product may be traded between a seller and a purchaser as a commodity. The computer program product may be distributed in the form of a machine-readable storage medium (e.g.: a compact disc read only memory (CD-ROM)), or distributed online through an application store (e.g.: PLAYSTORE™). In the case of online distribution, at least a portion of the computer program product may be at least temporarily stored in a storage medium such as a server of a manufacturer, a server of an application store, or a memory of a relay server, or temporarily generated.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

The description above is merely illustrative of the technical idea of the disclosure, and various modifications and variations are possible within the scope of the disclosure without departing from the essential characteristics of the disclosure. In addition, the embodiments according to the disclosure are not intended to limit the technical idea of the disclosure, but the scope of the technical idea of the disclosure is not limited by the embodiment. Therefore, the protection scope of the disclosure should be interpreted by the following claims, and all the technical ideas within the equivalent scope thereof should be construed as being included in the scope of the disclosure.

What is claimed is:

1. A display apparatus comprising:

a display panel including a pixel array, in which pixels that include a plurality of inorganic light-emitting elements of different colors are arranged in a matrix form, and a pixel circuit that is provided for each of the plurality of inorganic light-emitting elements, and the pixel circuit is configured to control, based on an applied image data voltage, a duration and a magnitude of a driving current provided to the inorganic light-emitting elements;

a sensor configured to sense, based on a voltage applied to the pixel circuit, a current flowing through a driving transistor included in the pixel circuit, and the sensor is configured to output sensing data corresponding to the sensed current; and a corrector configured to correct, based on the sensing data, the image data voltage applied to the pixel circuit, wherein the image data voltage comprises constant current generator data voltage, and wherein the pixel circuit comprises:

a constant current generator circuit comprising a first driving transistor configured to control the magnitude of the driving current based on the constant current generator data voltage.

2. The display apparatus of claim 1, wherein the image data voltage further comprises pulse width modulation (PWM) data voltage, wherein the pixel circuit comprises:

a PWM circuit comprising a second driving transistor configured to control the duration of the driving current based on the PWM data voltage.

3. The display apparatus of claim 2, wherein the voltage comprises a first voltage applied to the constant current generator circuit and a second voltage applied to the PWM circuit, and, wherein the sensor is further configured to:

sense a first current flowing through the first driving transistor based on the first voltage and output first sensing data corresponding to the first current, and sense a second current flowing through the second driving transistor based on the second voltage and output second sensing data corresponding to the second current.

4. The display apparatus of claim 3, wherein the pixel circuit comprises:

a first transistor having a source terminal connected to a drain terminal of the first driving transistor and a drain terminal connected to the sensor; and a second transistor having a source terminal connected to a drain terminal of the second driving transistor and a drain terminal connected to the sensor, wherein the first current is provided to the sensor through the first transistor while the first voltage is applied to the constant current generator circuit, and wherein the second current is provided to the sensor through the second transistor while the second voltage is applied to the PWM circuit.

5. The display apparatus of claim 3, wherein the corrector is further configured to correct the constant current generator data voltage based on the first sensing data and correct the PWM data voltage based on the second sensing data.

6. The display apparatus of claim 1, wherein the sensor is further configured to sense the current flowing through the driving transistor based on the voltage applied in a blanking interval of one image frame and output sensing data corresponding to the sensed current.

7. The display apparatus of claim 1, wherein the voltage is applied to pixel circuits corresponding to one pixel line of the pixel array per frame.

8. The display apparatus of claim 1, wherein the voltage is applied to pixel circuits corresponding to a plurality of pixel lines of the pixel array per image frame.

9. The display apparatus of claim 2, wherein the pixel circuit is configured to provide, based on the constant current generator data voltage being applied to a gate terminal of the first driving transistor and the PWM data voltage being applied to a gate terminal of the second driving transistor, and based on a sweep voltage that linearly changes being applied, a driving voltage of a magnitude corresponding to the constant current generator data voltage to the inorganic light-emitting element until a voltage of the gate terminal of the second driving transistor changes according to the sweep voltage and the second driving transistor is turned on.

10. The display apparatus of claim 2, wherein the constant current generator circuit comprises:

a first capacitor connected between a source terminal of the first driving transistor and a gate terminal; and a third transistor for applying the constant current generator data voltage to the gate terminal of the first driving transistor while being turned on, wherein the PWM circuit comprises:

a second capacitor including one end to which a linearly changing sweep voltage is applied and the other end connected to a gate terminal of the second driving transistor; and a fourth transistor configured to apply the PWM data voltage to a gate terminal of the second driving transistor while being turned on, wherein the drain terminal of the second driving transistor is connected to the gate terminal of the first driving transistor.

11. The display apparatus of claim 10, wherein the pixel circuit comprises:

a fifth transistor disposed between a drain terminal of the first driving transistor and an anode terminal of the inorganic light-emitting element, wherein the fifth transistor is turned on while the sweep voltage is applied.

12. The display apparatus of claim 2, wherein the constant current generator circuit and the PWM circuit are driven by different driving voltages.

13. The display apparatus of claim 1, wherein the inorganic light-emitting element is a light-emitting diode having a magnitude of 100 micrometers or less.

14. The display apparatus of claim 1, wherein the plurality of light-emitting elements of different colors are red, green, or blue inorganic light-emitting elements, or red, green, blue, and white inorganic light-emitting elements.

15. A method of controlling a display apparatus including a display panel, wherein the display panel comprises:

a pixel array, in which pixels composed of a plurality of inorganic light-emitting elements of different colors are arranged in a matrix form, and a pixel circuit that is provided for each of the plurality of inorganic light-emitting elements, and the pixel circuit controlling, based on an applied image data voltage, a duration and a magnitude of a driving current provided to the inorganic light-emitting elements, wherein the method comprises:

sensing, based on a voltage applied to the pixel circuit, a current flowing through a driving transistor included in the pixel circuit;

correcting, based on sensing data corresponding to the sensed current, the image data voltage applied to the pixel circuit; and controlling the magnitude of the driving current based on a constant current generator data voltage, wherein the image data voltage comprises the constant current generator data voltage.

* * * * *